US010231217B2

United States Patent
Jung et al.

(10) Patent No.: US 10,231,217 B2
(45) Date of Patent: Mar. 12, 2019

(54) METHOD FOR OPERATING TERMINAL IN WIRELESS COMMUNICATION SYSTEM, AND TERMINAL USING SAID METHOD

(71) Applicant: LG ELECTRONICS INC., Seoul (KR)

(72) Inventors: Sunghoon Jung, Seoul (KR); Youngdae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 65 days.

(21) Appl. No.: 15/500,682

(22) PCT Filed: Aug. 5, 2015

(86) PCT No.: PCT/KR2015/008222
§ 371 (c)(1),
(2) Date: Jan. 31, 2017

(87) PCT Pub. No.: WO2016/021943
PCT Pub. Date: Feb. 11, 2016

(65) Prior Publication Data
US 2017/0223691 A1   Aug. 3, 2017

Related U.S. Application Data

(60) Provisional application No. 62/033,612, filed on Aug. 5, 2014.

(51) Int. Cl.
H04W 4/00          (2018.01)
H04W 72/04        (2009.01)
(Continued)

(52) U.S. Cl.
CPC ......... *H04W 72/0406* (2013.01); *H04W 4/90* (2018.02); *H04W 88/04* (2013.01); *H04W 92/18* (2013.01)

(58) Field of Classification Search
None
See application file for complete search history.

(56) References Cited

U.S. PATENT DOCUMENTS

| 2013/0188546 | A1 | 7/2013 | Turtinen et al. | |
| 2014/0078971 | A1* | 3/2014 | Bontu | H04W 8/005 370/329 |
| 2017/0127219 | A1* | 5/2017 | Schmidt | H04W 4/70 |

FOREIGN PATENT DOCUMENTS

| KR | 10-2012-0073147 A | 7/2012 |
| WO | 2013/062351 A1 | 5/2013 |
| WO | 2013/077684 A1 | 5/2013 |

OTHER PUBLICATIONS

"D2D Communication Resource Allocation Mode 2", CATT, 3GPP TSG-RAN WG2 Meeting #85bis, Valencia, Spain, Mar. 31-Apr. 4, 2014, R2-141196.

(Continued)

*Primary Examiner* — Zewdu A Beyen
(74) *Attorney, Agent, or Firm* — Dentons US LLP

(57) ABSTRACT

Provided is a method for operating a terminal in a wireless communication system and a terminal using said method. The method comprises the steps of: transmitting, to a network, information indicating transmission necessity of a terminal-to-terminal control message; receiving, from the network, a setting regarding transmission of the terminal-to-terminal control message; and transmitting, to another terminal, the terminal-to-terminal control message on the basis of the setting.

10 Claims, 24 Drawing Sheets

(51) Int. Cl.
*H04W 4/90* (2018.01)
*H04W 88/04* (2009.01)
*H04W 92/18* (2009.01)

(56) References Cited

OTHER PUBLICATIONS

"3rd Generation Partnership Project; Technical Specification Group Radio Access Network; Evolved Universal Terrestrial Radio Access (E-UTRA); User Equipment (UE) procedures in idle mode (Release 8)", 3GPP TS 36.304 V8.5.0 (Mar. 2009).

\* cited by examiner

METHOD FOR OPERATING TERMINAL IN WIRELESS COMMUNICATION SYSTEM, AND TERMINAL USING SAID METHOD

CROSS-REFERENCE TO RELATED APPLICATIONS

This application is the National Stage filing under 35 U.S.C. 371 of International Application No. PCT/KR2015/008222, filed on Aug. 5, 2015, which claims the benefit of U.S. Provisional Application No. 62/033,612 filed on Aug. 5, 2014, the contents of which are all hereby incorporated by reference herein in their entirety.

BACKGROUND OF THE INVENTION

Field of the Invention

The present invention relates to wireless communication and, more particularly, to a method of transmitting a control message for D2D operation by a terminal to other terminal under control by a network and the terminal using the method.

Related Art

In an International Telecommunication Union Radio communication sector (ITU-R), a standardization of International Mobile Telecommunication (IMT)-Advanced being a next mobile communication system after a third generation has been performed. The IMT-Advanced is aimed at supporting an Internet Protocol (IP) based multi-media service with a data transmission rate of 1 Gbps in a stop and low speed moving state and a data transmission rate of 1 Gbps in a high speed moving state.

A 3rd Generation Partnership Project (3GPP) is preparing LTE-Advanced (LTE-A) being an improved one of Long Term Evolution (LTE) based on an OFDMA (Orthogonal Frequency Division Multiple Access)/SC-FDMA (Single Carrier-Frequency Division Multiple Access) transmission scheme as a system standard satisfying requirements of IMT-Advanced. The LTE-A is one important candidate for IMT-Advanced.

In recent years, there is growing interest in a Device-to-Device (D2D) technology performing direct communication between devices. In particular, the D2D is attracting attention as a communication technology for a public safety network. A commercial communication network has been rapidly changed to the LTE but a current public safety network is based on a 2G technology in a collision problem and a cost side with an existing communication standard. Request for the technology clearance and an improved service induces an effort to improve the public safety network.

The public safety network has high service requirements (reliability and security) as compared with a commercial communication network. In particular, when coverage of cellular communication is insufficient or is not used, there is a need for direct signal transmission/reception between devices, that is, a D2D operation.

The D2D operation may be signal transmission/reception between adjacent devices to have various advantages. For example, a D2D terminal may perform data communication with a high transmission rate and low delay. Further, the D2D operation may distribute traffic converged in a base station. If the D2D terminal serves as a relay, the D2D terminal may serve to extend coverage of a base station.

Meanwhile, when it is attempted to perform the D2D operation between a first terminal and a second terminal, the first terminal may be within network coverage, while the second terminal may be located out of the network coverage. In this case, a resource pool for the D2D operation may be configured to the first terminal, but it may not be configured to the second terminal, and thus the first terminal needs to inform the second terminal of the resource pool. In general, the first terminal within the coverage needs to transmit the control message for the D2D operation to the second terminal out of the coverage. In this case, in a prior art, it is not defined how the network controls the first terminal.

SUMMARY OF THE INVENTION

Technical problem to be solved in the present invention is to provide an operation method of terminal and the terminal using the method.

Provided is a method for operation of a user equipment (UE) in a wireless communication system is provided. The method comprises transmitting to a network, information informing of necessity of transmission of a inter UE control message, receiving from the network, a configuration on the transmission of the inter UE control message and transmitting, to other UE, the inter UE control message based on the configuration.

The inter UE control message may be an announcement with which a resource pool configured from the network to the UEs is informed to the other UE.

The resource pool may indicate resources being usable for a transmission of D2D (device-to-device) signal within a coverage of the network.

The inter UE control message may be an announcement to inform the other UE of information required to perform a relay function by the UE between the other UE and the network.

The information informing of necessity of transmission of the inter UE control message may be transmitted via a RRC (radio resource control) message.

The inter UE control message may be a control massage to be used for the purpose of public safety.

The method further comprises transmitting to the network, information indicating that the transmission of the inter UE control message is not required any more.

In another aspect, a user equipment (UE) is provided. The UE comprises a Radio Frequency (RF) unit that transmits and receives a radio signal and a processor operatively coupled to the RF unit, the processor that: transmits to a network, information informing of necessity of transmission of a inter UE control message, receives from the network, a configuration on the transmission of inter UE control message and transmits, to other UE, the inter UE control messages based on the configuration.

In accordance with the present invention, the terminal which enters within the network coverage informs the network that the control message for the D2D operation needs to be transmitted to other terminal out of the network coverage. Thus, the network may know that a particular terminal needs to transmit the control message for the D2D operation, and thus it may provide the particular terminal with an appropriate configuration. Under control/configuration of the network, the particular terminal transmits the control message for the D2D operation, and thus an interference to be influenced within the network coverage may be minimized over the case that the particular terminal randomly transmits the control message for the D2D operation.

DESCRIPTION OF EXEMPLARY EMBODIMENTS

Figure 1:
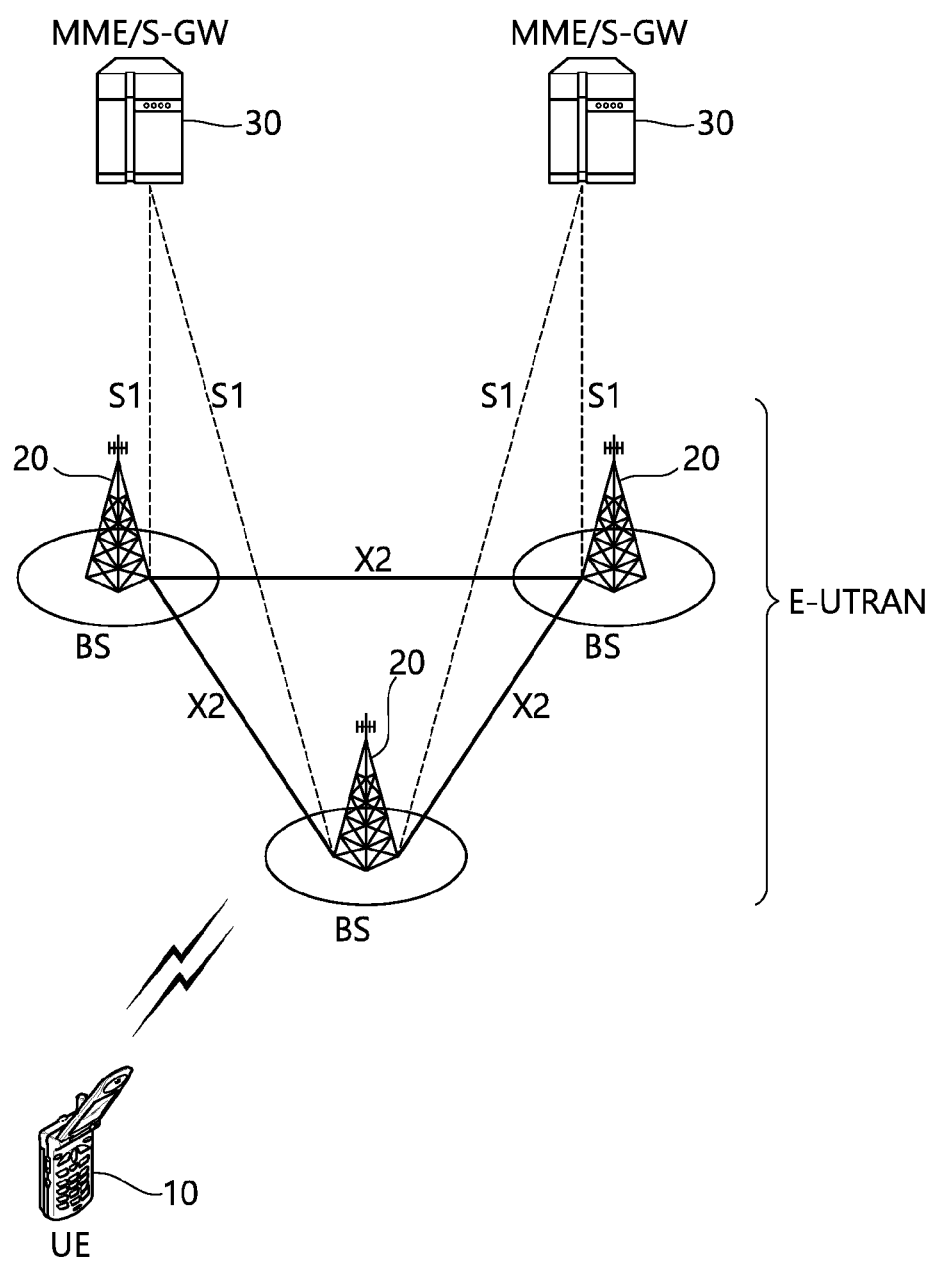
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
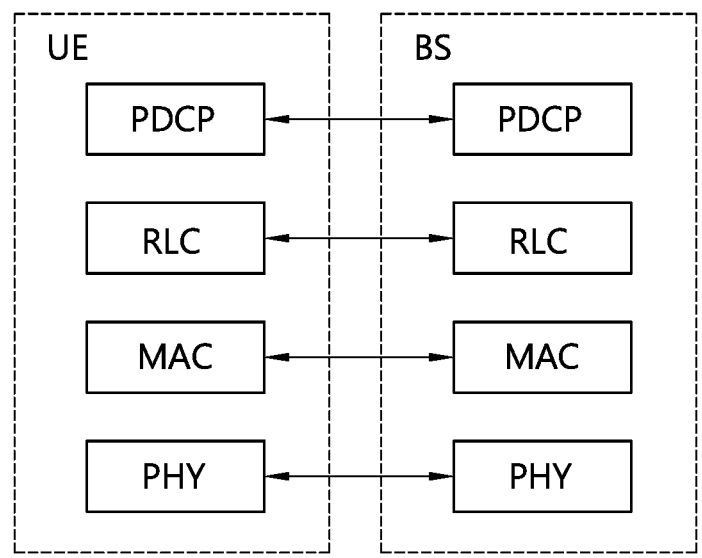
FIG. 2 is a diagram showing a wireless protocol architecture for a user plane.
Figure 3:
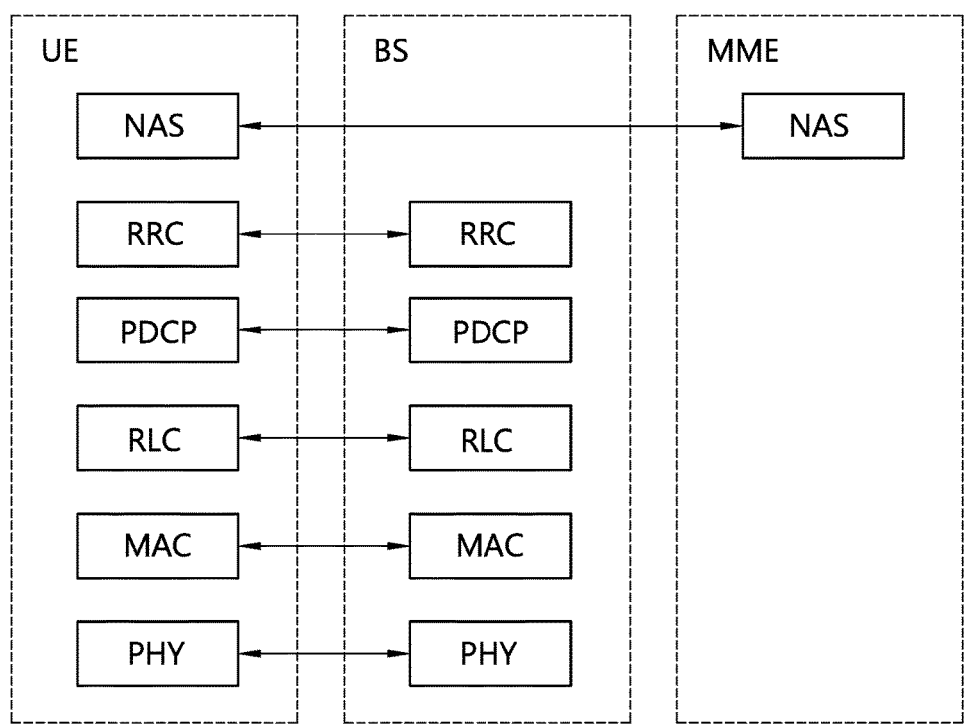
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
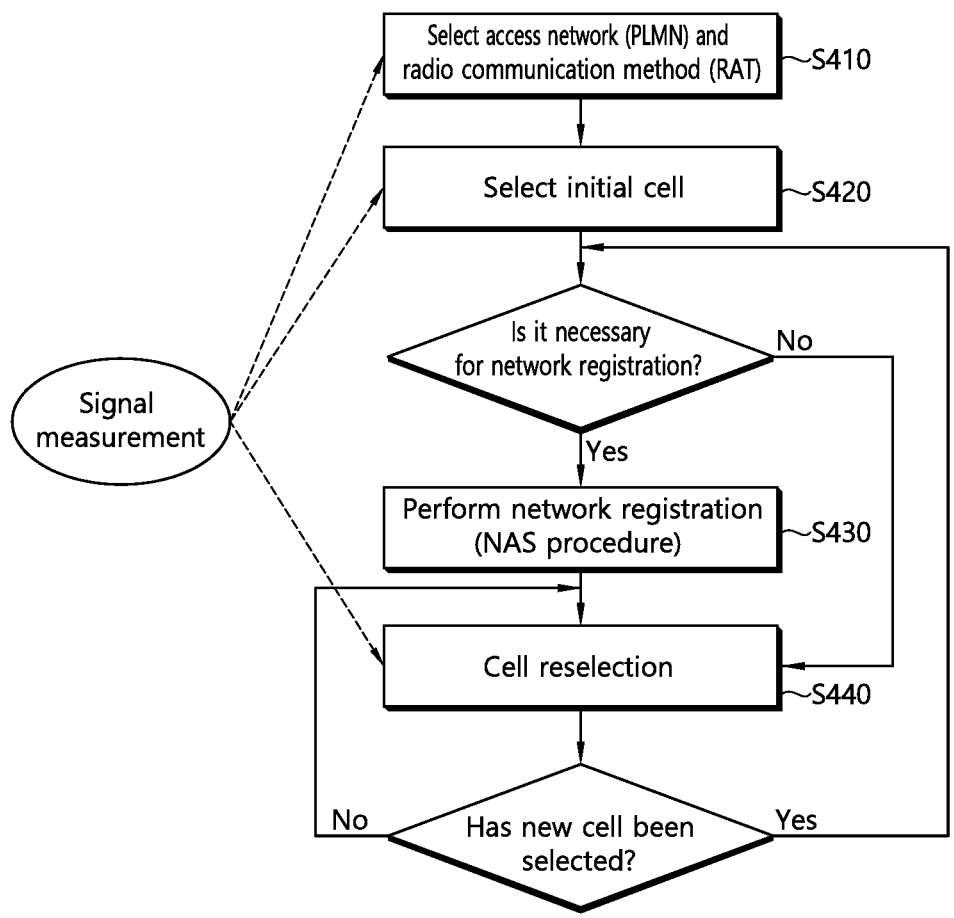
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
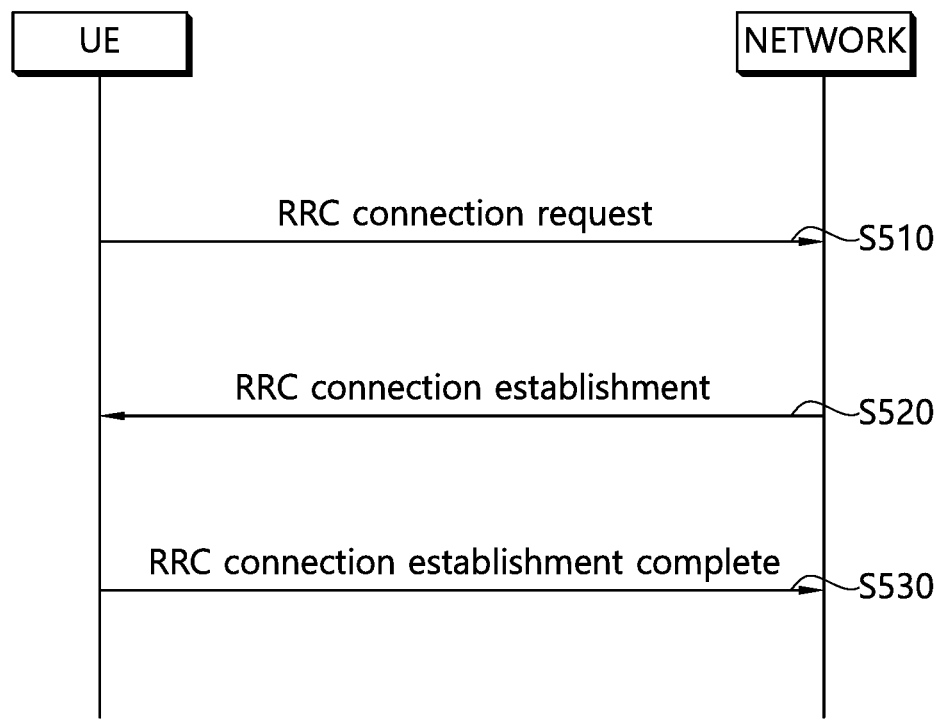
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
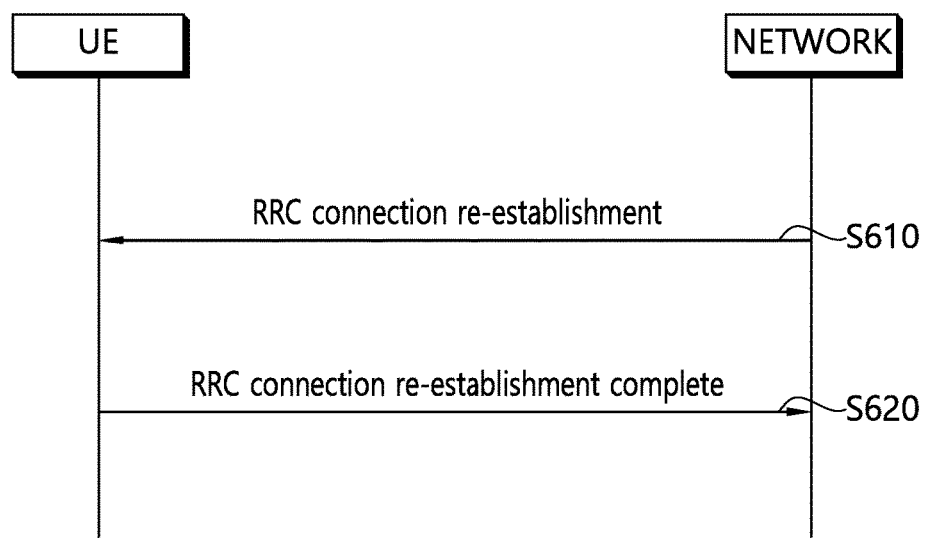
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC).

Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$Srxlev > 0 \text{ AND } Squal > 0,$$

where:

$$Srxlev = Q_{rxlevmeas} - (Q_{rxlevmin} + Q_{rxlevminoffset}) - P_{compensation},$$

$$Squal = Q_{qualmeas} - (Q_{qualmin} + Q_{qualminoffset}) \quad [\text{Equation 1}]$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, R_n = Q_{meas,n} - Q_{offset} \quad [\text{Equation 2}]$$

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
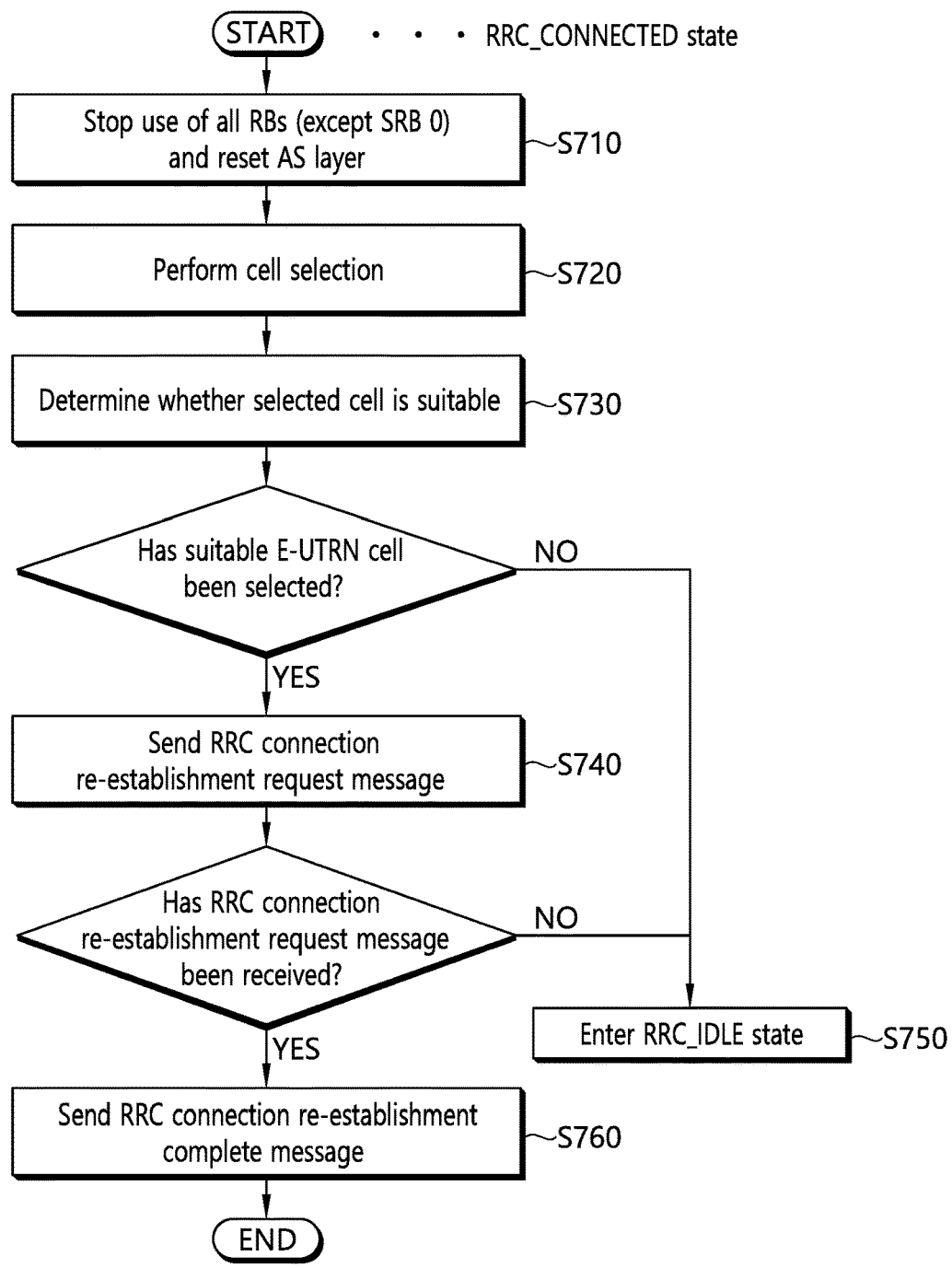
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
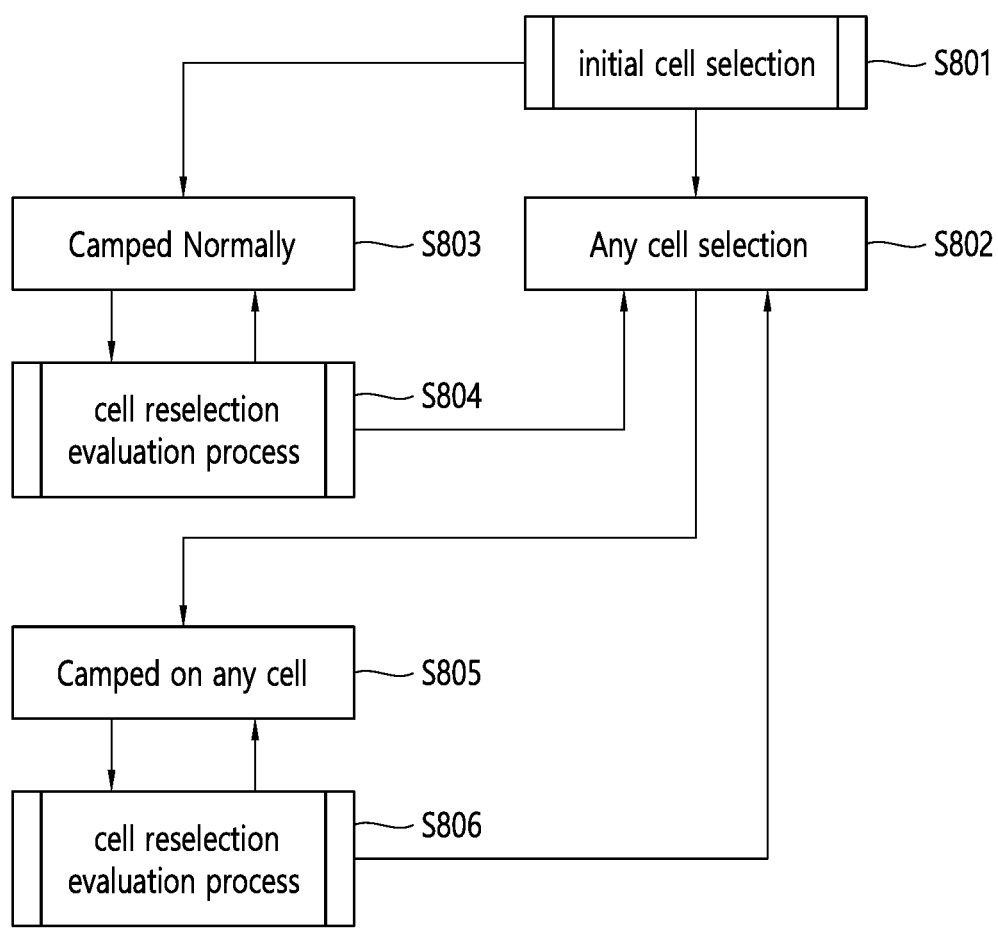
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
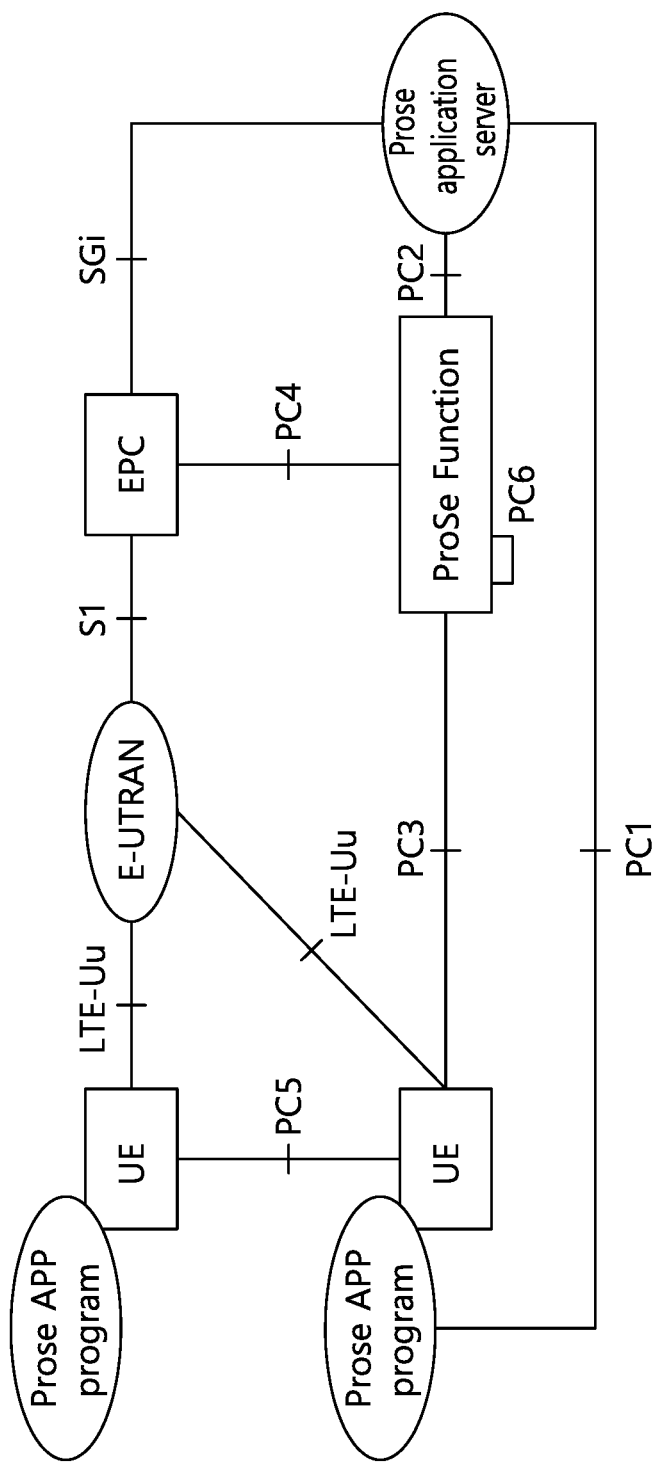
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.
  Interworking via a reference point towards the 3rd party applications
  Authorization and configuration of the UE for discovery and direct communication)
  Enable the function of the EPC level ProSe discovery
  ProSe related new subscriber data and handling of data storage, and also handling of ProSe identities
  Security related function
  Provide control towards the EPC for policy related function
  Provide function for charging (via or outside of EPC, e.g., offline charging))

Hereinafter, a reference point and a reference interface will be described in a reference structure for the ProSe.
  PC1: a reference point between a ProSe application program in the terminal and a ProSe application program in a ProSe application server. The PC1 is used to define signaling requirements in an application level.
  PC2: is a reference point between the ProSe application server and a ProSe function. The PC2 is used to define an interaction between the ProSe application server and a ProSe function. An application data update of a ProSe database of the ProSe function may be an example of the interaction.
  PC3: is a reference point between the terminal and the ProSe function. The PC3 is used to define an interaction between the terminal and the ProSe function. Configuration for ProSe discovery and communication may be an example of the interaction.
  PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.
  PC5: is a reference point to use control/user plane for discovery, communication, and relay between terminals, and 1:1 communication.
  PC6: is a reference point to use a function such as ProSe discovery between users included in different PLMNs.
  SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
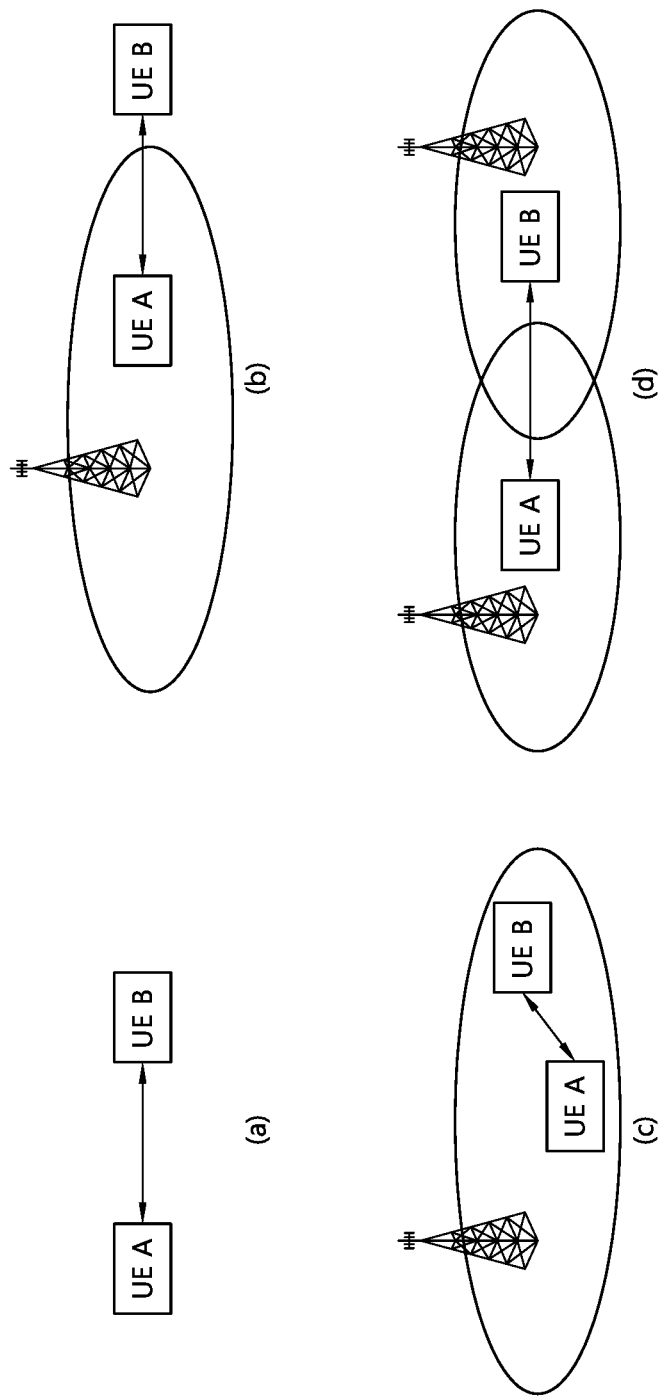
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Figure 11:
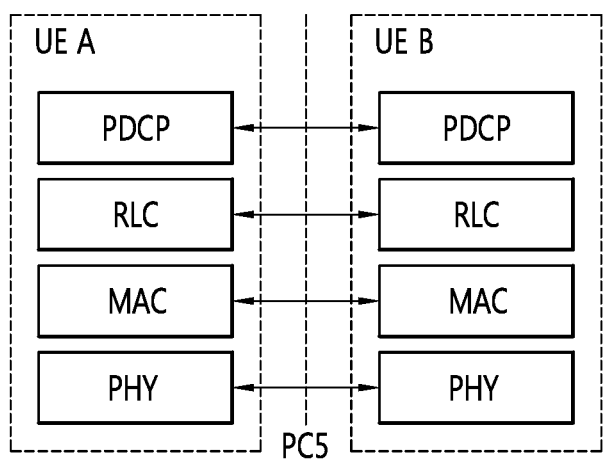
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
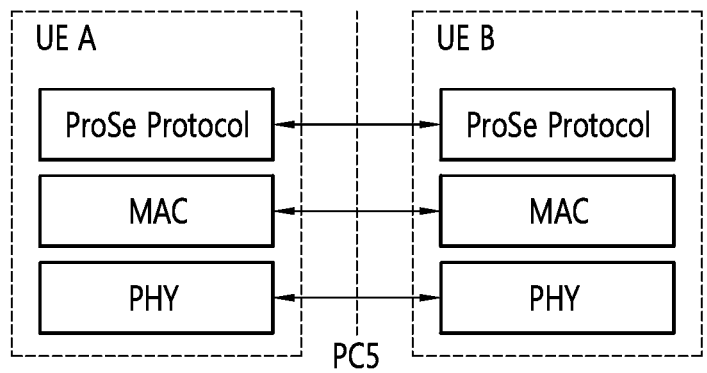
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

Figure 13:
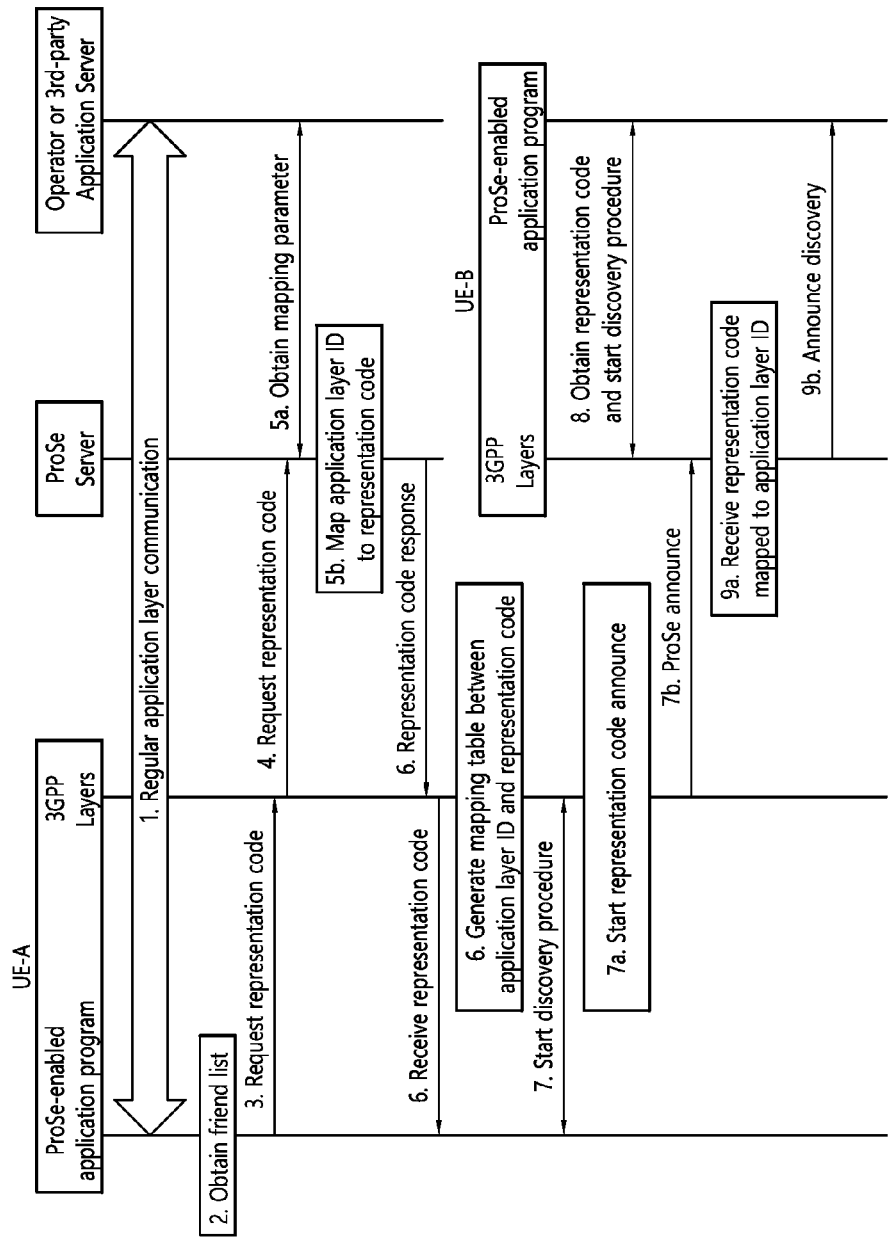
FIG. 13 illustrates an embodiment of a ProSe direct discovery procedure.

FIG. 13 illustrates an embodiment of a ProSe direct discovery procedure.

Referring to FIG. 13, it is assumed in a terminal A and a terminal B that a ProSe-enabled application program is operated, and the terminal A and the terminal B are configured in a friend relationship to each other, that is, a relationship capable of allowing D2D communication with each other in the application program. Hereinafter, the terminal B may be expressed as a friend of the terminal A. For example, the application program may be a social networking program. 3GPP Layers correspond to functions of an application program for using a ProSe discovery service regulated according to 3GPP.

A ProSe direct discovery between the terminal A and the terminal B may perform a following procedure.

1. First, the terminal A performs regular application-Layer communication with an application server. The above communication is performed based on Application programming interface (API).

2. A ProSe enabled application program of the terminal A receives a list of application layer IDs having a friend relationship. The application layer ID may generally be in the form of a network access ID. For example, an application layer ID of the terminal A may have a form such as adam@example.com.

3. A terminal A requests private expression codes for a user and private expression codes for a friend of the user.

4. 3GPP layers transmit an expression code request to a ProSe server.

5. The ProSe server map application layer IDs provided from an operator or a third application server to private expression codes. For example, an application layer ID such as adam@example.com. The mapping may be performed based on parameters (e.g., mapping algorithms, key values, and the like) received from an application service of the network.

6. The ProSe server responds the obtained expression codes to the 3GPP layers. The 3GPP layers report that expression codes with respect to the requested application layer are successively received to the ProSe enabled application program. Further, a mapping table between the application layer IDs and the expression codes are generated.

7. The ProSe enabled application program requests the 3GPP layers to start the discovery procedure. That is, when one of friends is located close to the terminal A and direct communication may be performed, the ProSe enabled application program attempts the discovery. 3GPP layers announce a private expression code of the terminal A (that is, "GTER543$#2FSJ67DFSF" which is a private expression code of adam@example.com in the above example). In mapping of an application layer ID of a corresponding application program and the private expression code, the mapping relationship may be known by the previously received friends, and the mapping may be performed.

8. It is assumed that the terminal B is operating the same ProSe enabled application program as that of the terminal A, and the above steps 3 to 6 may be executed. 3GPP layers included in the terminal B may perform ProSe discovery.

9. When the terminal B receives the above announce from the terminal A, the terminal B determines whether the private expression code included in the announce is known by the terminal B or is mapped to an application layer ID. As illustrated in step 8, since the terminal B performs steps 3 to 6, the terminal B knows a private expression code with respect to the terminal A, mapping of the private expression code to the application layer ID, and which is a corresponding application program. Accordingly, the terminal B may discover the terminal B from the announce of the terminal A. The 3GPP layers in the terminal B announces that adam@example.com is discovered to the ProSe enable application program.

FIG. 13 illustrates a discovery procedure by taking into consideration the terminals A and B, the ProSe server, and the application server. Only an operation side between the terminals A and B is described. The terminal A transmits a signal called the announce (the procedure may refer to announcement), and the terminal B receives the announce to discover the terminal A. That is, a discovery procedure of FIG. 13 in an operation directly related to another terminal among operations performed by each terminal may refer to a single step discovery procedure may refer to a single step discovery procedure in a side of one step.

Figure 14:
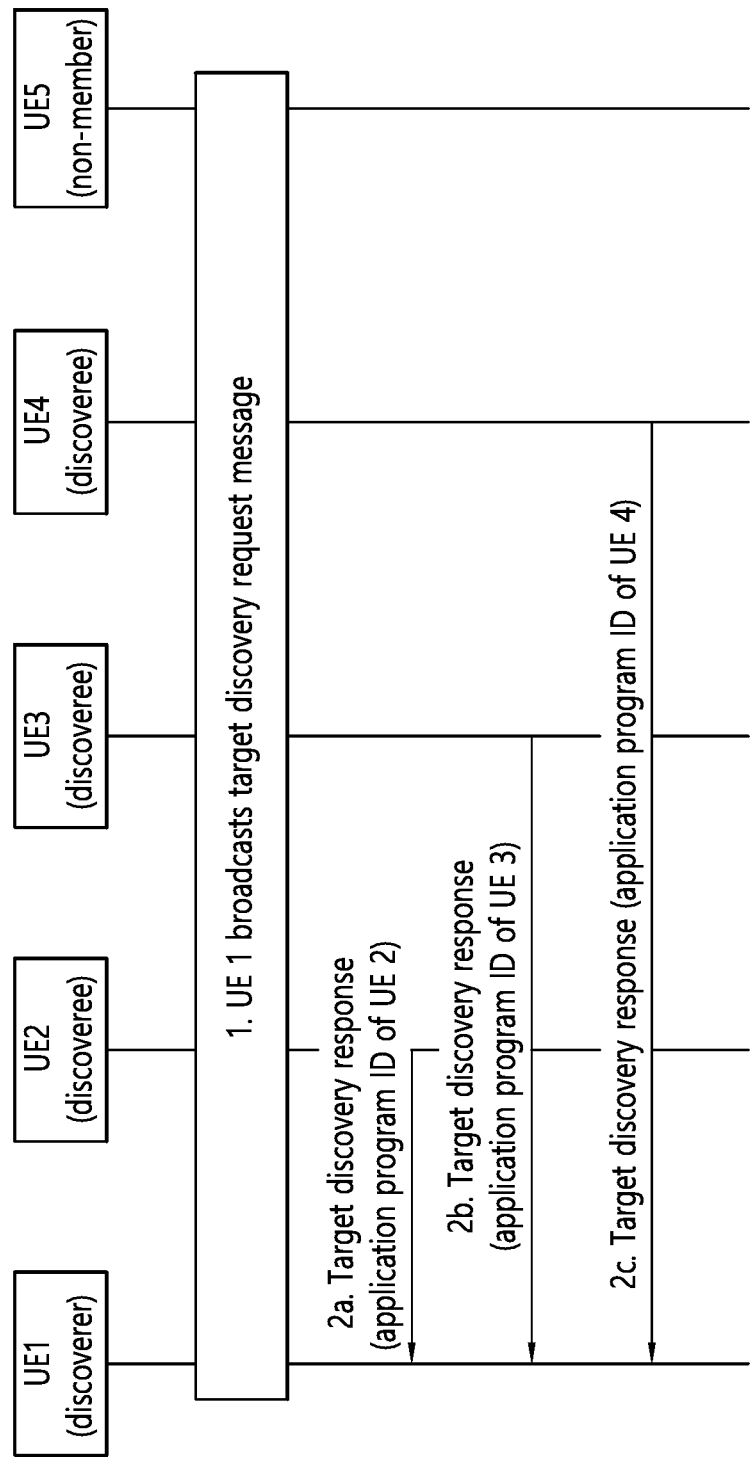
FIG. 14 illustrates another embodiment of a ProSe direct discovery procedure.

FIG. 14 illustrates another embodiment of a ProSe direct discovery procedure.

In FIG. 14, it is assumed that the terminal 1 to the terminal 4 may be included in a specific group communication system enablers (GCSE) group. It is assumed that the terminal 1 is a discoverer and terminals 2, 3, and 4 are a discoveree. A terminal 5 is a terminal regardless of a discovery procedure.

The terminal 1 and the terminals 2 to 4 may perform a following operation in a discovery procedure.

First, the terminal 1 broadcasts a targeted discovery request message (hereinafter referred to 'discovery request message' or 'M1') in order to discover whether an optional terminal included in the GCSE group is located around the terminal 1. The targeted discovery request message may include a unique application program group ID or a layer-2 group ID of the specific GCSE group. Further, the targeted discovery request message may include a unique ID of the terminal 1, that is, an application program private ID. The targeted discovery request message may be received by the terminals.

The terminal 5 transmits no response messages. The terminals 2, 3, and 4 included in the GCSE group transmit a targeted discovery response message (hereinafter referred to as a discovery response message or M2) as a response to the targeted discovery request message. The targeted discovery response message may include a unique application program private ID of a terminal transmitting the message.

An operation of terminals in a ProSe discovery procedure illustrated in FIG. 14 will be described. A discoverer (UE 1) transmits the targeted discovery request message, and receives a targeted discovery response message being a response thereto. In addition, if a discoveree (e.g., UE 2) receives the targeted discovery request message, the discoveree transmits a targeted discovery response message as a response thereto. Accordingly, each terminal performs an operation a second step. In the above side, a ProSe discovery procedure of FIG. 14 may refer to a discovery procedure.

In addition to the discovery procedure illustrated in FIG. 14, if the terminal 1 (discoverer) transmits a discovery confirm message (hereinafter may refer to M3) as a response to the targeted discovery response message, this may refer to a third step discovery procedure.

In the present invention, a network node such as a terminal may provide relay function for other network node. As for the terminal which provides relay function, it may be classified into a UE-NW relay, a UE-UE relay based on the any of network nodes among which the relay function is provided.

Figure 15:
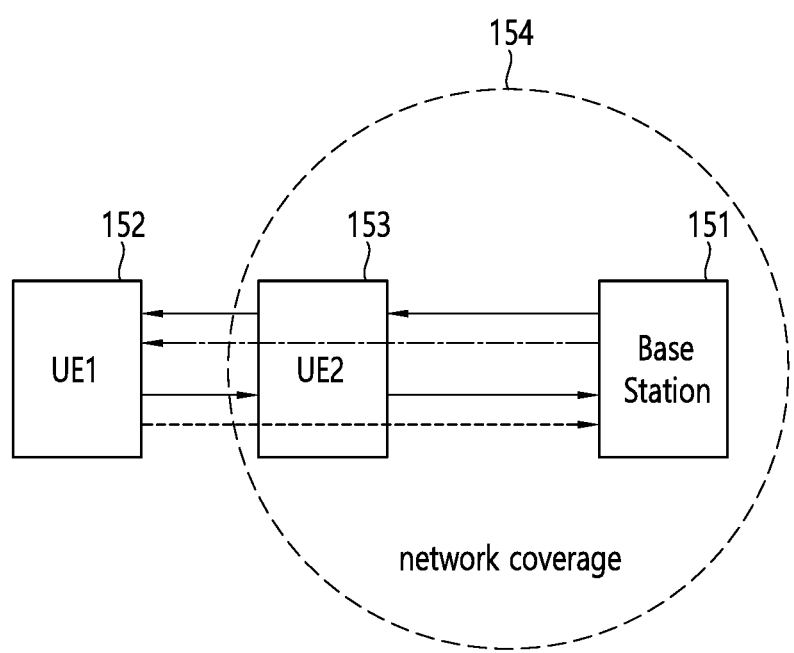
FIG. 15 represents the UE-NW relay.

FIG. 15 represents the UE-NW relay.

Referring to FIG. 15, a second terminal 153 plays a role of the UE-NW relay. That is, the second terminal 153 is a network node playing the role of the relay between a first terminal 152 located out of the network coverage 154 and the network 151, and in this case the second terminal 153 is referred to as the UE-NW relay.

In FIG. 15, as the first terminal 152 is located out of network coverage, if the second terminal 153 does not provide the relay function, then communications with the network 151 may not be performed.

The UE-NW relay 153 transmits and receives data via a communication among terminals (D2D operation) with the first terminal 151, and it transmits and receives data via a general terminal-network communication with the network.

Now, the present invention is explained.

The terminal within the network coverage (the first terminal) may perform a D2D operation with the terminal out of network coverage (the second terminal). In this case, the first terminal may inform the second terminal of a control message for the D2D operation. This is referred to as an announcement in below.

As an example of the announcement, the first terminal may transmit the control information informing the second terminal of at least one of a resource pool (capable of being used for a transmission of D2D signal), time/frequency synchronization information and timing information configured from the network.

As other example of announcement, the first terminal may transmit relay operation configuration information to the second terminal. As explained in FIG. 15, the first terminal within the coverage may relay communication among the second terminal out of the network coverage, which is referred to as a D2D relay service. In this case, the second terminal may be connected with the network via a link for the D2D operation (which may be referred to as a sidelink or D2D link) with the first terminal. In this case, the first terminal may provide the relay operation configuration information to provide the second terminal with the D2D relay service.

As for the relay operation configuration information, for example, it may include at least one of relay state information indicating whether the D2D relay service is provided by the first terminal (e.g.: relay service initiation, relay service stop), information indicating an ID of the first terminal ID (e.g.: Layer 2 ID, an ID which is included in a destination of D2D message when the second terminal transmits a message to the first terminal in D2D), information indicating a remaining amount of battery of the first terminal, information indicating a serving cell ID (a physical layer Cell ID or a Global cell ID) of the first terminal, or information indicating PLMN information (primary PLMN and secondary PLMN(s)) belonging to a serving cell of the first terminal.

As other example of the announcement, the first terminal may transmit to the second terminal, information indicating a neighboring cell measurement result of the first terminal, information indicating the maximum bit rate to be provided to the second terminal by the first terminal, or information indicating the minimum bit rate to be provided to the second terminal by the first terminal, etc.

As other example of the announcement, information indicating a serving cell measurement result of the first terminal, 'configuration information on measurement and report' to request a measurement report on the side link from the first terminal to the second terminal, 'configuration information on measurement and report' to request a measurement report on the downlink from the first terminal to the second terminal etc., may be transmitted.

As other example of the announcement, information to be requested to report, from the first terminal to the second terminal, information indicating a resource pool to be used by the second terminal, may be transmitted. A condition needs to be defined in order for the terminal to perform the announcement or to stop the announcement. The most direct method is to configure for each terminal via a dedicated signal such that the network makes the terminal perform the announcement or stop the announcement and thus the corresponding terminal would perform or stop the announcement based on the dedicated signal.

However, according to a prior art, the network cannot know that which one of multiple terminals wants to perform the announcement or which terminal does not want to perform the announcement.

Further, after the terminal enters within the network coverage, then it attempts the RRC connection establishment, and if the network does not know that the terminal needs to perform the announcement urgently for the D2D operation, then the RRC connection establishment for the terminal may be delayed, and thus the announcement may be delayed and it may result in a stop of the D2D operation.

In the present invention, it provides the operation method of the terminal and the terminal using the method, in which these issues may be solved.

Figure 16:
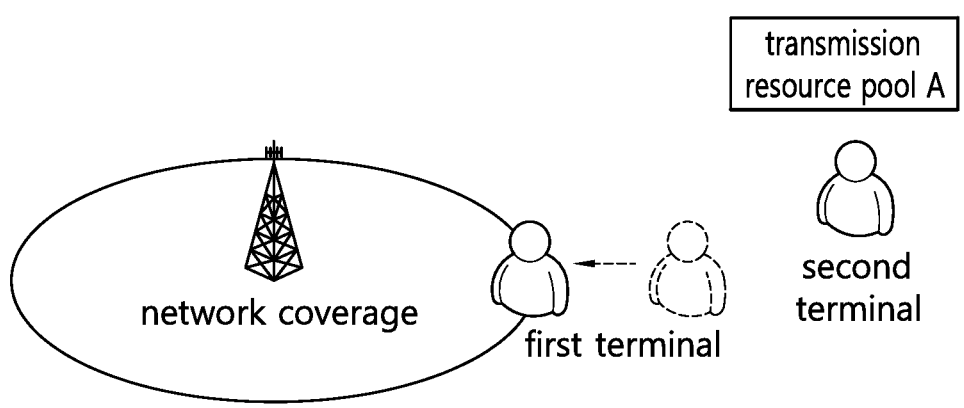
FIG. 16 illustrated a case in which the present invention may be applied.

FIG. 16 illustrated a case in which the present invention may be applied.

Referring to FIG. 16, the first terminal (UE 1) located out of the network coverage may move to enter within the network coverage. Then, the first terminal performs the D2D operation using the resource configured by the network. If the first terminal performs the D2D operation with the second terminal out of the network coverage, it may be an issue which resource is used while the first terminal and the second terminal perform the D2D operation, and the following method 1 or method 2 may be used.

The method 1 is a method that the terminals out of the network coverage modify the resource for the D2D operation to be matched to the resource pool in the network coverage. The method 2 is a method that the terminal within the network coverage limits/modifies the resource for the D2D operation to be matched to the resource pool used by the terminals out of the network coverage.

Figure 17:
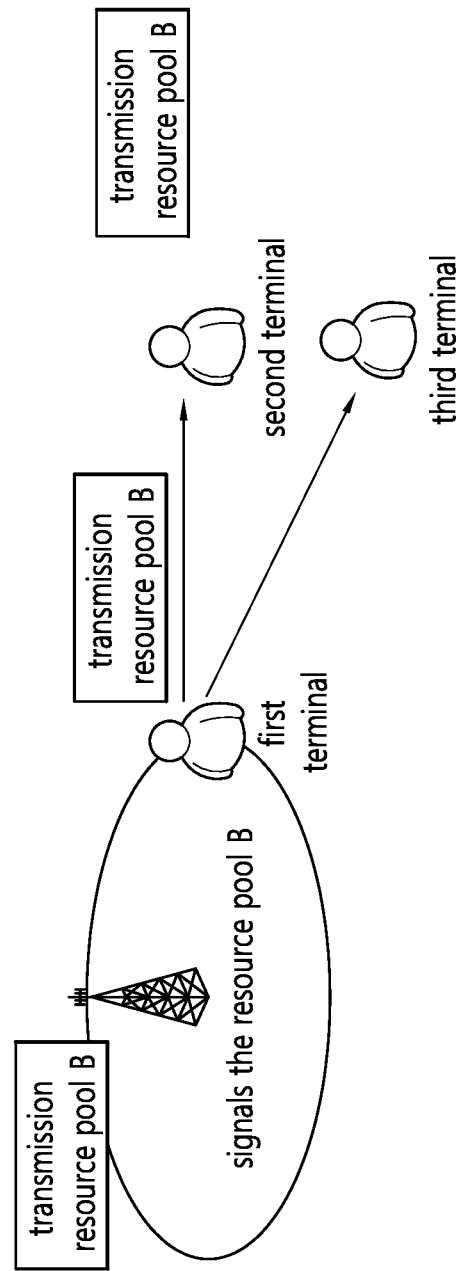
FIG. 17 represents the D2D operation method of the terminal in accordance with the method 1.

FIG. 17 represents the D2D operation method of the terminal in accordance with the method 1.

Referring to FIG. 17, the first terminal receives from the network, resource pool information indicating resource pool B to be used for a D2D signal transmission within the network coverage (referred to as 'coverage' in below). The resource pool information may include the synchronization information required to use the resource pool and/or the timing information required to identify the resource in time.

The first terminal may announce (inform) the resource pool B to the second terminal and the third terminal out of the coverage, and the second terminal and the third terminal performs the D2D operation with the first terminal by using the resource pool B. The announcement may be performed by an instruction from the network or may be performed by a predefined rule.

The first terminal may announce the transmission resource pool used for the D2D signal transmission to the second terminal and the third terminal. If the second terminal and the third terminal receives the announcement, then the resource used for the D2D signal transmission may be replaced with the transmission resource pool indicated by the announcement.

Further, the first terminal may announce a reception resource pool used for the D2D signal reception to the second terminal and the third terminal. The second terminal and the third terminal may monitor the D2D signal in the reception resource pool transferred by the announcement. The second terminal and the third terminal may extend its own reception resource pool to include the reception resource pool transferred by the announcement.

Figure 18:
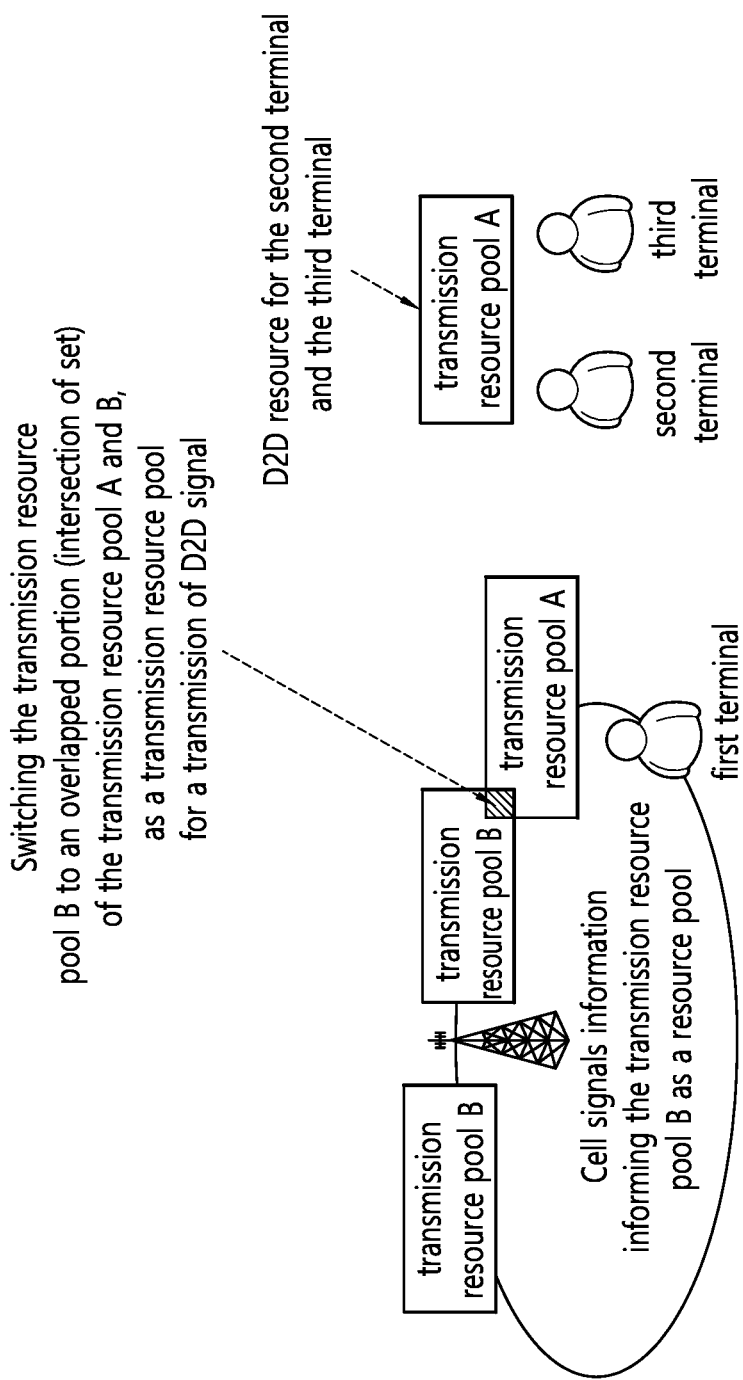
FIG. 18 represents the D2D operation method of the terminal in accordance with the method 2.

FIG. 18 represents the D2D operation method of the terminal in accordance with the method 2.

Referring to FIG. 18, the network signals the transmission resource pool B to be usable for the D2D signal transmission. The second terminal and the third terminal out of the coverage may use the transmission resource pool A for the D2D signal transmission. As for the first terminal which moves from out of the coverage into the coverage, after it receives the signal to configure the transmission resource pool B from the network, it configures the resource for the D2D signal transmission as the intersection of sets of transmission resource pool A, B The first terminal, the second terminal and the third terminal may transmit the D2D signal using the resource belonging to the intersection of sets. When the first terminal transmits the D2D signal, it matches its transmission timing to the reception resource pool of the terminal out of the coverage as the second terminal and the third terminal. For example, if the second terminal and the third terminal have its reception resource pool allocated in the TDD (time division duplex) manner, then the first terminal should transmit the D2D signal by considering the UL-DL configuration of the second terminal and the third terminal.

If the method 2 is used, then the base station should know the reception resource of the terminal out of the coverage, in which the terminal within the coverage may receive the information informing the reception resource from the terminal out of the coverage, and terminal within the coverage may transmit it to the base station.

The terminal within the coverage performs the announcement to the terminal out of the coverage in accordance with any one of the above mentioned method 1, 2. In general, the terminal within the coverage transmits to the terminal out of the coverage, the control message to inform the resource (determined by the method 1 or 2) for the D2D operation.

The terminal may perform the announcement once, or may perform the announcement multiple times. For example, the terminal may periodically perform the announcement. Or, the terminal may perform the announcement by the number of times indicated by the network. Or, the terminal may continuously perform the announcement until it explicitly receives the signal to stop the announcement from the network.

Figure 19:
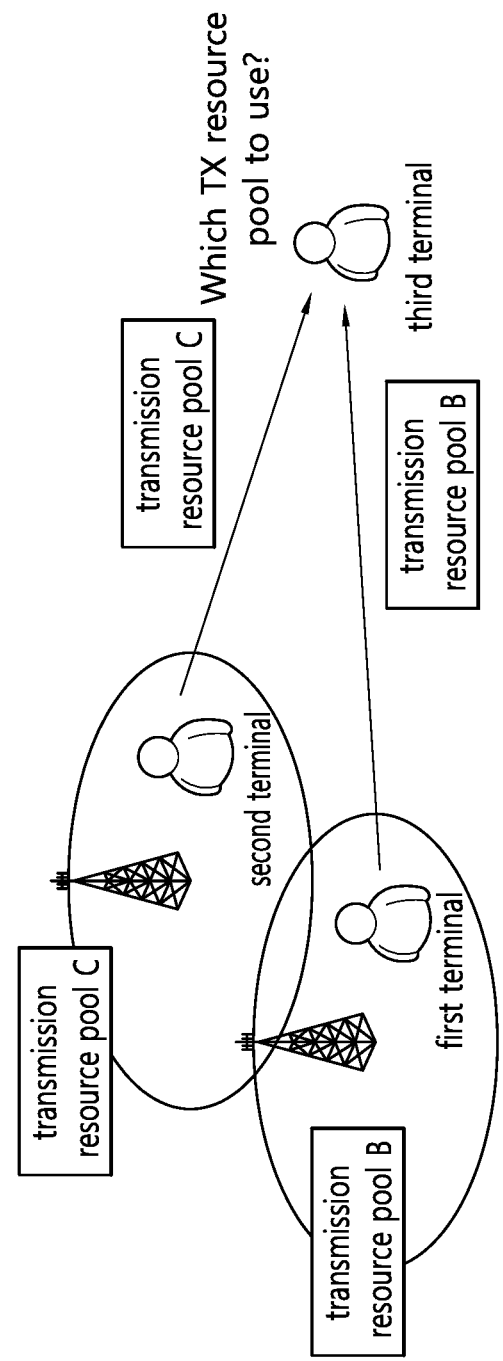
FIG. 19 illustrates the case that the terminals in each of multiple cells inform the same terminal out of the coverage of different transmission resource pools.

FIG. 19 illustrates the case that the terminals in each of multiple cells inform the same terminal out of the coverage of different transmission resource pools.

Referring to FIG. 19, the first terminal and the second terminal are terminals within the coverage in each of different cells. If the first terminal and the second terminal inform the third terminal out of the coverage of the transmission resource pool B, C respectively, then it may be an issue that the third terminal should transmit the D2D signal using which transmission resource pool. It may be assumed that transmission resource pool B, C is not the completely overlapped resource pool, i.e. the same resource pool. In this case, whether the third terminal uses which transmission resource pool, may be selected from the perspective of the implementation of the terminal.

Embodiment I

As mentioned above, the terminal within the network coverage (the first terminal) may perform the D2D operation with the terminal out of the network coverage (the second terminal), in which the first terminal may inform the second terminal of the control message for the D2D operation. However, in a prior art, since the network cannot know that the first terminal wants to transmit the control message, it would be a difficult issue that the network controls the first terminal.

To solve the issue, in the present invention, it is proposed to inform the network that the terminal within the coverage is required to transmit the control message to the terminal out of the coverage.

When the first terminal informs the network of the necessity of the announcement, it is available to indicate its purpose of the announcement. To indicate its purpose of the announcement is to determine whether the network configures the information to be included in the announcement (the control message transmission) to the first terminal, or determine whether the network permits the announcement based on the purpose. To inform the network of the necessity or purpose of the announcement may be referred to as a request of the announcement.

The announcement request may be transmitted via sidelink UE information RRC message to the network. Or, the announcement request e.g. which is included in RRC connection setup complete message, may be transmitted to the network during the RRC connection establishment procedure.

If the network receives the announcement request from the terminal, then the network may indicate the announcement message transmission to the terminal. When the network indicates the announcement message transmission to the terminal, the information to be included in the announcement message may be indicated or informed.

Figure 20:
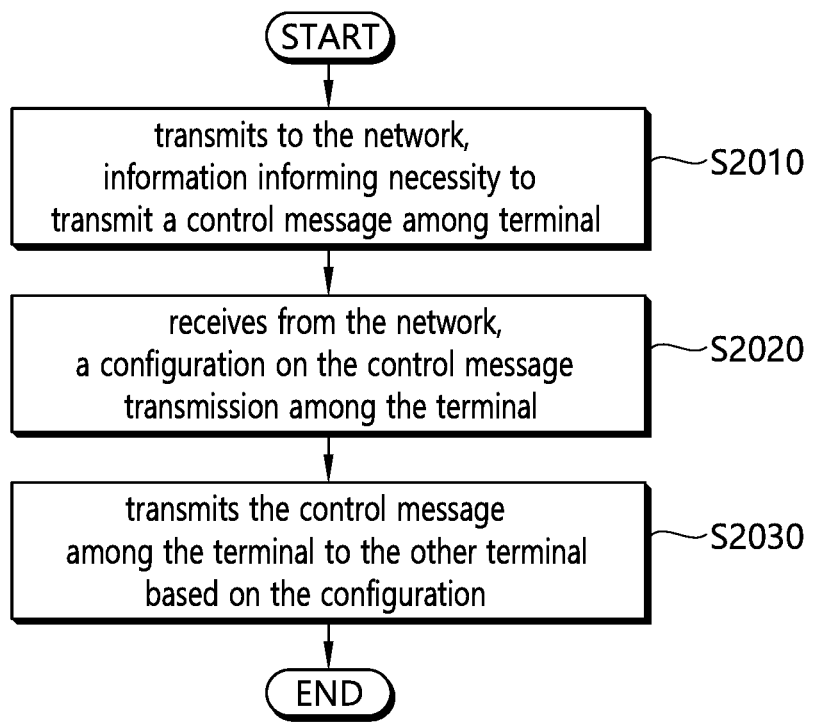
FIG. 20 represents the operation method of the terminal in accordance with the embodiment I.

When the network indicates the announcement message transmission to the terminal, it may indicate the RRC state in which the announcement is available. For example, it may be indicated that the announcement is available only in a RRC connection state, or, it may be indicated that the announcement is available in both a RRC idle state and the RRC connection state, or it may be indicated that the announcement is available only in the RRC idle state. When the network indicates the announcement message transmission to the terminal, configuration information on start/continuation/stop of the announcement may be provided as well. FIG. 20 represents the operation method of the terminal in accordance with the embodiment I.

Referring to FIG. 20, the terminal transmits to the network, the information informing necessity to transmit the control message among a terminal (S2010).

The control message among the terminal, for example, may include the information informing the terminal out of the coverage of the resource pool configured for the D2D operation by the network.

The terminal receives from the network, a configuration on the control message transmission among the terminal (S2020).

The terminal transmits the control message among the terminal to the other terminal based on the configuration (S2030). The other terminal may be the terminal out of the network coverage.

Figure 21:
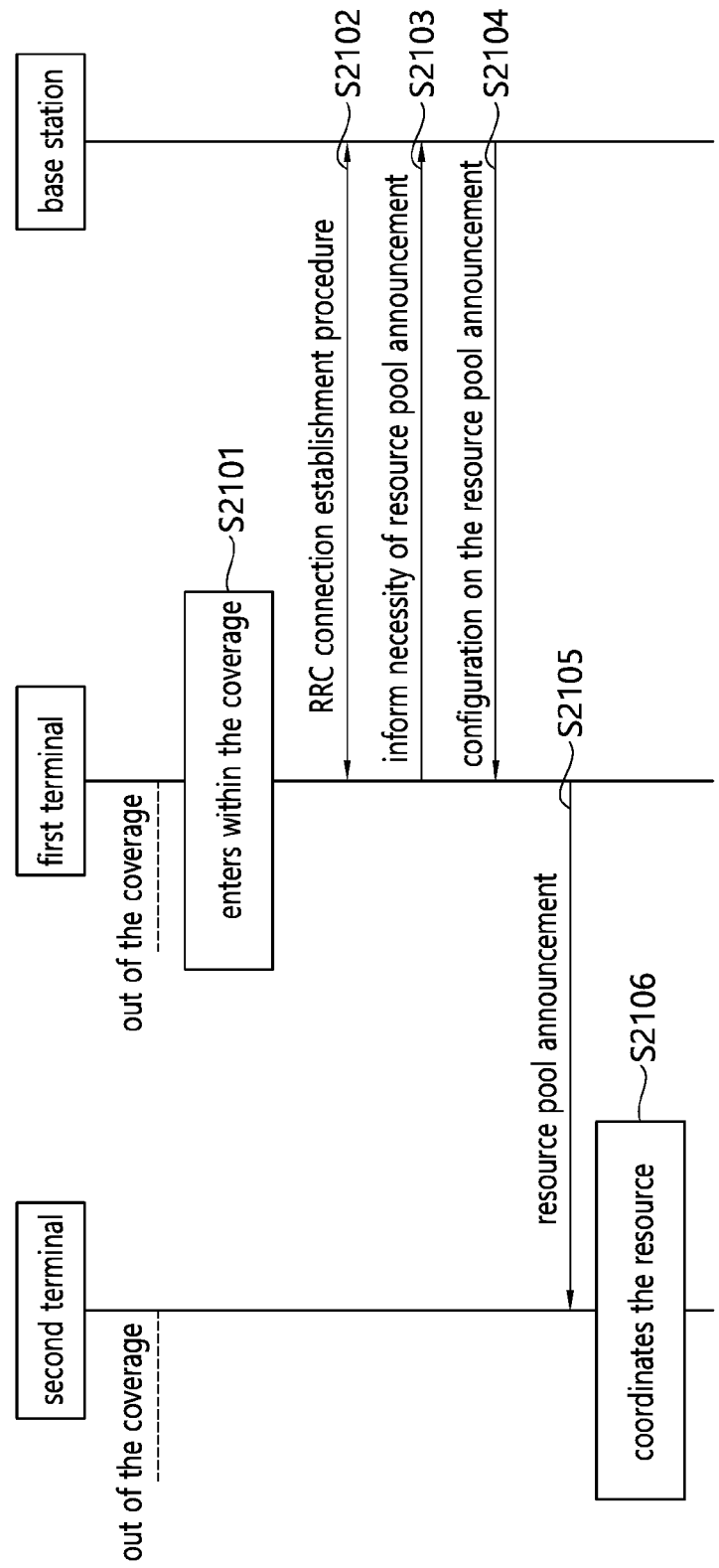
FIG. 21 illustrates an example in which embodiment I is applied to the D2D operation.

FIG. 21 illustrates an example in which embodiment I is applied to the D2D operation.

Referring to FIG. 21, the first terminal enters from out of the coverage into the coverage (S2101). The second terminal is located out of the coverage.

The first terminal starts a RRC connection establishment procedure with the base station (S2102).

The first terminal informs the base station (network) of the control message among the terminal, e.g. necessity of resource pool announcement (S2103).

The base station provides the first terminal with a configuration required to transmit the control message among the terminal (S2104). For example, the configuration may be a configuration on the announcement of resource pool, and it may inform that the announcement may be transmitted by using which resource.

The first terminal transmits the control message among the terminal, e.g., the resource pool announcement based on the configuration (S2105). The resource indicated by the resource pool announcement may indicate the resource by the above mentioned method 1, method 2.

The second terminal coordinates the resource for the D2D operation based on the control message among the terminal e.g. the resource pool announcement.

FIG. 21 illustrates the case that the announcement performed by the first terminal informs the second terminal of the D2D resource configured by the network (base station), but it is not limited thereto.

As mentioned above, the announcement may be to inform the second terminal of the relay operation configuration information. In this case, the first terminal informs the network (base station) that it is required that the relay operation configuration information is transmitted, and receives from the network, a configuration to transmit the relay operation configuration information. The first terminal may transmit the relay operation configuration information to the second terminal based on the configuration. The second terminal may know whether the D2D relay service of the first terminal is provided, the first terminal ID, the remaining amount of battery of the first terminal, the serving cell ID (physical layer Cell ID or Global cell ID) of the first terminal, and PLMN to which the serving cell of the first terminal is belonged etc. based on the relay operation configuration information transmitted by the first terminal. The second terminal may communicate with the network (base station) by utilizing the first terminal as a relay.

When the terminal needs to announce the resource pool configured by the network, the terminal may be in the RRC idle state. In this case, the terminal may transmit the RRC connection configuration request to the network in order to transit to the RRC connection state. After the transition into the RRC connection state, the network may configure whether the terminal is informed that the announcement of resource pool is required. It is configured via a dedicated signal or a broadcast signal.

The terminal may inform the network of necessity of the announcement during the RRC connection establishment procedure. Or, the necessity of the announcement may be informed via the dedicated signal to the network, after the RRC connection establishment procedure has been finished.

If the network receives from the terminal, the information indicating the necessity of the announcement, then it may configure the information for the resource pool to be announced.

Meanwhile, the information indicating the necessity of the announcement may be transferred from a source cell to a target cell in a handover process. Or, the information indicating the necessity of the announcement may not be transferred from the source cell to the target cell in the handover process. In this case, after handover has been finished, the target cell may transmit to the terminal, the information indicating the necessity of the announcement.

The announcement on the resource pool used within the coverage may be performed once, or may be performed multiple times. The announcement performed once only is not sufficient to inform all terminals of a resource pool, and in this case the announcement may be performed multiple times. If the announcement of resource pool is permitted by the network, then it may be preferred that the announcement is performed multiple times.

It may be an issue for implementation of the terminal how many and how often announcements of resource pool may be performed. For example, if the announcement is configured, then terminal may continue to consider that the announcement is permitted until it explicitly receives a configuration to stop the announcement, and the actual number of announcements is an issue for implementation of the terminal.

The terminal may periodically perform the announcement. The network should be able to configure for the terminal to stop the announcement at any time. If the network configures to stop the announcement, then the terminal immediately stop the announcement.

Meanwhile, though it is not illustrated in FIG. 21, the first terminal may inform the network that the announcement is not required any more. This may be sort of announcement configuration release request.

Embodiment II

When the terminal makes a call to establish the RRC connection, the terminal provides the network with the information indicating a RRC connection establishment cause. The network may perform a suitable access control for the terminal based on the RRC connection establishment cause.

The following table 2 illustrates an example of the RRC connection request message including the RRC connection establishment cause value.

TABLE 2

```
-- ASN1START
RRCConnectionRequest ::=            SEQUENCE {
        criticalExtensions                       CHOICE {
                rrcConnectionRequest-r8          RRCConnectionRequest-r8-IEs,
                criticalExtensionsFuture         SEQUENCE { }
        }
}
RRCConnectionRequest-r8-IEs ::=     SEQUENCE {
        ue-Identity                              InitialUE-Identity,
        establishmentCause                       EstablishmentCause,
        spare                                    BIT STRING (SIZE (1))
}
InitialUE-Identity ::=              CHOICE {
        s-TMSI                                   S-TMSI,
        randomValue                              BIT STRING (SIZE (40))
}
```

TABLE 2-continued

```
EstablishmentCause ::=         ENUMERATED {
                                      emergency, highPriorityAccess,   mt-Access,
mo-Signalling, mo-Data, delayTolerantAccess-v1020, spare2, spare1}
-- ASN1STOP
```

In the above table 2, 'EstablishmentCause' is a field indicating the RRC connection establishment cause. The value which the 'EstablishmentCause' may have is in the following table.

TABLE 3

| RRC 확립 원인 값 | RRC 확립 원인 |
|---|---|
| No 1. | 긴급 (emergency) |
| No 2. | 고순위접근 (highPriorityAccess) |
| No 3. | mt-access |
| No 4. | mo-signaling |
| No 5. | mo-data |
| No 6. | delayTolerantAccess |

In the above table 3, the 'emergency' represents an urgent situation or an emergency situation. The 'high priority access (highPriorityAccess)' represents that a priority of the access is high. The 'mt-access,' the 'mo (Mobile Originating)-signaling,' the 'mo-data,' and 'delayTolerantAccess,' may represent a Mobile Terminating access, a Mobile Originating access of the terminal, an access for data transmitted by the terminal, and an access tolerant to delay, respectively.

As shown in the table 3, there is no RRC connection establishment cause value to identify between a ProSe-enabled public safety call ('PS call' in below) and a ProSe-enabled non-public safety call ('non-PS call' in below.) Thus, it is impossible for the network to identify between the PS call and the non-PS call, and thus it is impossible for the network to perform the access control to be identified for each call. Further, it is impossible to make it differentiate for degree of emergency of a subsequent network operation to serve the call in addition to the access control whether it is the PS call or the non-PS call.

Further, let's assume that the terminal enters within the network coverage, and the terminal needs to perform the announcement urgently. In this case, the terminal should be able to perform the RRC connection establishment with the network in order to perform the announcement, and it should be able to perform the announcement based on the configuration of the network. However, the network cannot know that the terminal is performing the RRC connection establishment procedure since it is required to perform this urgent announcement. This is because as shown in the table 3, in a prior art, there is no RRC connection establishment cause value indicating the call for the announcement. Thus, the RRC connection establishment for the announcement of resource pool may be delayed, and thus it may result in the D2D operation to be stopped.

In the present invention, to solve this issue, it is proposed to give a priority for the RRC connection establishment to inform the network of the necessity of the announcement, or the RRC connection establishment procedure for performing the announcement. That is, the RRC connection establishment attempt to inform the necessity of the announcement related to communication for the public safety (PS), may be handled as the PS (public safety) call.

If the necessity of the announcement is not related to the PS communication, then the RRC connection establishment attempt for the announcement may be handled as the non-PS call.

If the corresponding call is handled as the PS call, the terminal applies the access control applicable to the PS call. The access control may be a service specific access control (S SAC) or an application specific congestion control for data communication (ACDC) for data communication.

Similarly, the method may be also applicable to RRC connection establishment for the announcement of resource pool configured by the network. That is, if the announcement is required for the communication for the public safety, then the RRC connection establishment attempt for the announcement may be similarly handled as the PS call. Or, if the announcement is not related to the communication for the public safety, then the RRC connection establishment attempt for the announcement may be similarly handled as the non-PS call.

If the corresponding call is handled as the PS call, then the terminal applies the access control applicable to the PS call. The access control may be a service specific access control (SSAC) or an application specific congestion control for data communication (ACDC) for data communication.

Meanwhile, ProSe direct communication (D2D communication) standard technology in 3GPP Rel-12 is specifically introduced for the public safety communication and it is applicable to a Vehicle-to-vehicle (V2V) communication service for public safety. The V2V service is an example of V2X (Vehicle to everything) service, the V2X service implies a service in which a vehicle communicates with other persons/things and thus makes its purpose to maximize public safety and/or provide convenient services. A call for V2X emergency safety service may be considered as the above mentioned PS call and thus it may be referred to as the V2X PS call. The service, for which the emergency communication is not required, despite of the V2X service, may be considered as the non-PS call, and thus it may be referred to as the V2X non-PS call.

In below, in order for the network to identify between the PS call and the non-PS call, it is explained that the terminal provides the network with the information to identify a call based on any one of the following methods A, B, C. As mentioned above, the call for the RRC connection establishment to inform the network of the necessity of the announcement or the call for the RRC connection establishment to perform the announcement is handled as the PS call, or the other call is handled as the non-PS call.

I. Method A

In the method A, the terminal identifies the PS call and the non-PS call at a higher layer such as a NAS layer, the higher layer of the terminal, e.g., the NAS layer may provide different information to a lower layer, an AS layer, based on whether the call is the PS call or the non-PS call. However, the same RRC establishment cause value may be mapped to the PS call and the non-PS call.

The terminal may provide the network with additional information (indicator) with which the network may identify whether the corresponding call is the PS call or the non-PS call. This additional information (indicator) may be included in the RRC connection setup complete message. Or, the additional information (indicator) may be included in an extension field of the RRC connection setup request message.

Figure 22:
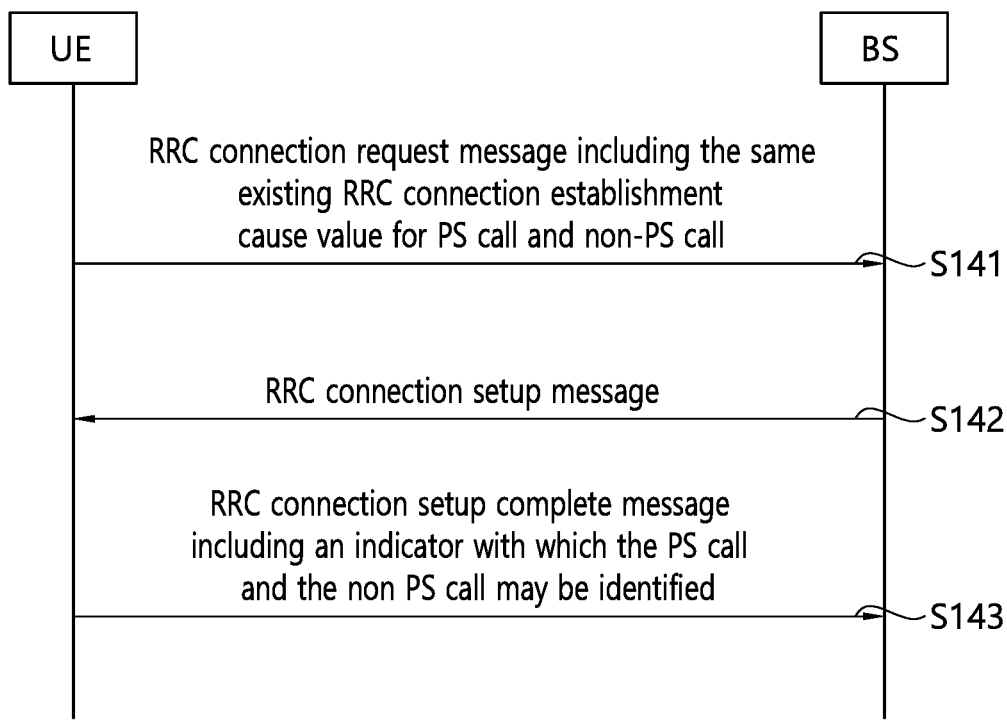
FIG. 22 represents an operation method of the terminal in accordance with an embodiment of the present invention.

FIG. 22 represents an operation method of the terminal in accordance with an embodiment of the present invention.

Referring to FIG. 22, the terminal configures the same existing RRC connection establishment cause value to the PS call and the non-PS call, and transmits the RRC connection request message including the cause value to the base station (S141).

In response to the RRC connection request message, the base station transmits the RRC connection setup message (S142).

The terminal transmits to the base station, the connection setup complete message including the indicator capable of identifying the PS call and the non-PS call (S143).

That is, the terminal uses identically a specific value of the existing RRC establishment cause value for both the PS call and the non-PS call in the RRC connection request message, and may provide by additionally including the information capable of identifying the PS call and the non-PS call in the RRC connection setup complete message.

The method A may be classified as the following embodiments 1, 1-1, 2, and 2-2.

Embodiment 1

In the embodiment 1, the terminal uses identically the existing RRC establishment cause value for both the PS call and the non-PS call, and if the corresponding call is the PS call, then the information indicating the PS call may be further provided.

The terminal may be operated for the PS call in the following manner. Firstly, the terminal configures the RRC establishment cause value as a value to be provided by the higher layer such as the NAS layer. The RRC establishment cause value provided by the higher layer may be the same as any one of the existing RRC establishment cause values shown in Table 3.

The terminal additionally provides the network with the information indicating that the corresponding call is the PS call. This information may be provided in the RRC connection establishment process, and for example, the information indicating the PS call may be provided in the RRC Connection Setup Complete message (RRCConnectionSetupComplete message).

When the terminal additionally provides the network with the information indicating that the corresponding call is the PS call, one bit indicator may be included to indicate that the corresponding call is the PS call. Or, the indicator indicating a specific purpose of the PS call (e.g., purpose for the V2X PS service) may be included in the RRC connection establishment process, e.g., the RRC connection setup complete message.

The terminal may be operated for the non-PS call in the following manner. Firstly, the RRC establishment cause value is configured as a value provided by the higher layer. The value provided by the higher layer may be the same as any one of the existing RRC establishment cause value to be used for the PS call. That is, the same existing RRC connection establishment cause value is used for the PS call and the non-PS call.

The terminal may explicitly provide the network with the information indicating that the corresponding call is the non-PS call. For example, the information indicating the non-PS call may be provided to be included in the RRC Connection Setup Complete message (RRCConnectionSetupComplete message).

Or, the terminal does not transmit the information with which it may identify whether the corresponding call is the PS call or the non-PS call, and thus it may indirectly (implicitly) inform the network that the corresponding call is the non-PS call. When the information that the corresponding call is the PS call is not included in the RRC connection setup complete message, the network may consider the corresponding call the non-PS call.

Embodiment 1-1

In the embodiment 1-1, the terminal identically uses the existing RRC establishment cause value for both the PS call and the non-PS call, and if the corresponding call is the non-PS call, then the information indicating the non-PS call may be further provided.

That is, in the embodiment 1, if the corresponding call is the PS call, then the terminal additionally provides the information indicating the PS call, whereas in the embodiment 1-1 unlike the embodiment 1, if it is the non-PS call, then the information indicating the non-PS call is to be additionally provided.

According to the embodiment 1-1, the terminal may be operated for the PS call in the following manner.

Firstly, the RRC establishment cause value is configured as a value to be provided by the higher layer. The value to be provided by the higher layer may be the same as any one of the existing RRC establishment cause value. For example, the PS call may have the RRC establishment cause value such as the 'emergency,' or the 'high priority access (highPriorityAccess)' etc.

The terminal does not include in the RRC connection setup complete message, the information capable of identifying whether the corresponding call is the PS call or the non-PS call, and thus it may be indirectly (implicitly) informed to the network that the corresponding call is the PS call. If the information that the corresponding call is the PS call is not included in the RRC connection setup complete message, then the network may consider the corresponding call the PS call. Or, the terminal may further provide the network with the information indicating that the corresponding call is the PS call.

The terminal may be operated for the non-PS call in the following manner.

Firstly, the RRC establishment cause value is configured as a value to be provided by the higher layer value. The value to be provided by the higher layer value may be the same as any one of the existing RRC establishment cause values to be used for the PS call.

The terminal may explicitly provide the network with the information indicating that the current call is the non-PS call. For example, the information indicating the non-PS call may be transmitted to be included in the RRC connection Setup complete message (RRCConnectionSetupCompletemessage).

Embodiment 2

In the embodiment 2, the terminal uses the same RRC establishment cause value for the PS call and non-PS call, and may use not the existing RRC establishment cause value but a newly defined RRC establishment cause value.

If the corresponding call is the PS call, then the terminal may further provide the information indicating the PS call.

As explained in detail, the RRC establishment cause value is configured as a valued to be provided by the higher layer, which may be not the existing RRC establishment cause value but a newly defined RRC establishment cause value. For example, the higher layer of terminal may identically use not the existing RRC establishment cause value such as the 'emergency,' and the 'a high priority access (highPriorityAccess),' etc. but the new RRC establishment cause value indicating 'a proximate service (ProSe)' for the PS call and non-PS call. As another example, the higher layer of the terminal may identically use the new RRC establishment cause value indicating the V2X service for a call for the V2X service corresponding to the V2X PS service and the V2X non-PS service.

The network cannot identify whether the corresponding call is the PS call or the non-PS call only based on the RRC establishment cause value such as the 'proximity service (ProSe)' or the V2X service and thus the terminal may provide the network with the information with which it can identify whether the corresponding call is the PS call or the non-PS call in the RRC connection establishment procedure. For example, the terminal may transmit to be included in the RRC connection setup complete message, the information with which it can identify whether the corresponding call is the PS call or the non-PS call.

According to the embodiment 2, the terminal may operate for the non-PS call in the following manner.

Firstly, the RRC establishment cause value is configured as the value to be provided by the higher layer. In this case, the value to be provided by the higher layer may be not the existing RRC establishment cause values but a newly defined value. For example, the higher layer of the terminal may use not the existing RRC establishment cause value such as the emergency or the highPriorityAccess etc. but the RRC establishment cause value indicating the ProSe.

The terminal does not include in the RRC connection setup complete message, the information capable of identifying whether the corresponding call is the PS call or the non-PS call, and thus it may be indirectly (implicitly) informed to the network that the corresponding call is the non-PS call. If the information that the corresponding call is the PS call is not included in the RRC connection setup complete message, then the network may consider the corresponding call the non-PS call.

Or, the terminal may further explicitly provide the network with the information indicating that the corresponding call is the non-PS call. For example, the information indicating the non-PS call may be transmitted to be included in the RRC connection setup complete message (RRCConnectionSetupComplete message). That is, if it is the PS call, then the information indicating the PS call is included in the RRC connection setup complete message, and if it is the non-PS call, then the information indicating the non-PS call is included in the RRC connection setup complete message.

Embodiment 2-1

In the embodiment 2-1, the terminal identically uses the existing RRC establishment cause value or a newly defined RRC establishment cause value for the PS call and the non-PS cal, and if the corresponding call is the non-PS call, then the information indicating the non-PS call may be further provided to the network.

The terminal may be operated for the PS call in the following manner.

Firstly, the RRC establishment cause value is configured as the value to be provided by the higher layer. In this case, the value to be provided by the higher layer may be the existing RRC establishment cause values or a newly defined value. For example, the higher layer of the terminal may use the existing RRC establishment cause value such as the emergency or the high priority access (highPriorityAccess) etc. or the RRC establishment cause value indicating the 'proximity service (ProSe)'.

For any case, the network cannot identify whether the corresponding call is the PS call or the non-PS call only based on the RRC establishment cause value.

The terminal may not provide the network with the information capable of identifying whether the corresponding call is the PS call or the non-PS call for the PS call in the RRC connection establishment procedure. For example, the terminal may not include in the RRC connection setup complete message, the information capable of identifying whether the corresponding call is the PS call or the non-PS call.

On the other hand, for the non-PS call, the terminal may provide the network with the information indicating that the corresponding call is the non-PS call, being included in the RRC connection setup complete message.

That is, according to the embodiment 2-1, the terminal may be operated for the non-PS call in the following manner.

Firstly, the RRC establishment cause value is configured as the value to be provided by the higher layer. In this case, the value to be provided by the higher layer may be the existing RRC establishment cause values or a newly defined value. For example, the higher layer may provide the existing RRC establishment cause value such as the emergency or the highPriorityAccess etc. or a new RRC establishment cause value indicating a Prose-enabled PS call. The terminal may explicitly provide the network with the information indicating that the current call is the non-PS call. For example, the information indicating the non-PS call may be transmitted to be included in the RRC connection setup complete message (RRCConnectionSetupComplete message).

If the above mentioned method A is used, the network can not identify between the PS call and non-PS call only based on the RRC connection establishment cause value. The network receives the information capable of identifying between the PS call and non-PS call, or confirms in the absence of the information, and thus it can identify whether the corresponding call is the PS call or the non-PS call.

II. Method B

In the method B, the PS call and the non-PS call may be identified in the higher layer. That is, the higher layer such as the NAS layer of the terminal provides the lower layer such as the AS layer with information different from each other for the PS call and the non-PS call. Difference from the method A is that different RRC establishment cause values are mapped to the PS call and the non-PS call.

For example, for the PS call, the emergency may be configured for the RRC establishment cause value, whereas, for the PS call, the mo-Data may be configured for the RRC establishment cause value.

Or, for the PS call, the highPriorityAccess may be configured for the RRC establishment cause value, whereas, for the non-PS call, the mo-Data may be configured for the RRC establishment cause value.

Or, for the PS call, not the existing values but a newly defined value, e.g., the cause value of 'ProSe' may be configured for the RRC establishment cause value, whereas, for the non-PS call, the mo-Data may be configured for the RRC establishment cause value.

Or, for the PS call, not the existing values but a newly defined value, e.g., the cause value of V2X may be configured for the RRC establishment cause value, whereas, for the non-PS call, the mo-Data may be configured for the RRC establishment cause value.

If the method B is used and the network receives the RRC establishment cause value, then it may be identified whether the corresponding call is the PS call or the non-PS call. However, it is not excluded that a various type of call is mapped to the same RRC establishment cause value, and in this case, the various type of call cannot be identified. For example, if the PS call and Prose-enabled emergency call is mapped to the same RRC establishment cause value (emergency call), then the network cannot identify whether the corresponding call is the PS call or the Prose-enabled emergency call.

III. Method C

In the method C, the PS call and the non-PS call is identified in the higher layer. Further, different RRC establishment cause values are mapped to the PS call and the non-PS call, and the terminal may additionally provide the network with information with which different purposes/ uses of PS call are identified. That is, in the method 3, the PS call is more classified into and thus the information is to be additionally provided to the network, indicating explicitly whether the PS call is any one among the Prose-enabled PS call, the V2X PS call, or the Prose-disabled PS call, or the ProSe based V2X PS call, or non ProSe based V2X PS call. Or, the terminal may provide the network with an indicator with which the call by the existing RRC connection establishment cause value and the PS call may be identified.

Figure 23:
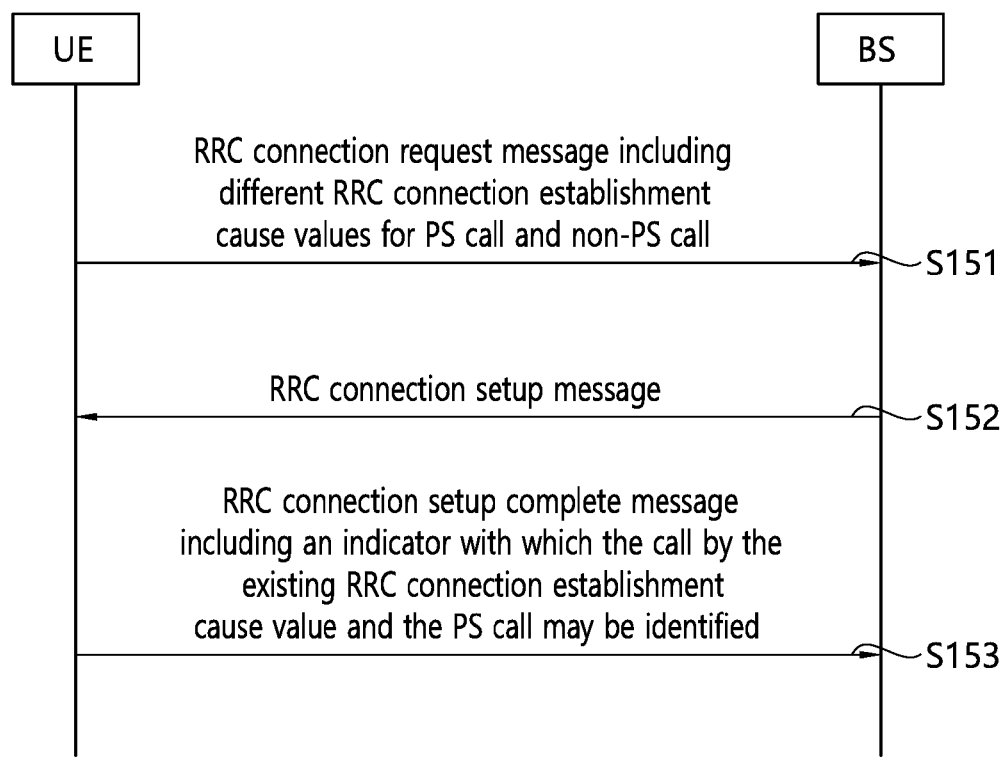
FIG. 23 represents an operating method of the terminal in accordance with another embodiment of the present invention.

FIG. 23 represents an operating method of the terminal in accordance with another embodiment of the present invention.

Referring to FIG. 23, the terminal transmits the RRC connection request message including different existing RRC connection establishment cause values for the PS call and the non-PS call (S151).

The base station transmits the RRC connection setup message to the terminal (S152).

The terminal transmits the RRC connection setup complete message including an indicator with which the call by the existing RRC connection establishment cause value and the PS call may be identified (S153).

The method C may be variously applicable to the following embodiment 1, 2, and 3.

Embodiment 1

In the embodiment 1 of the method C, the terminal configures the emergency of the existing RRC establishment cause value for the PS call. If the network receives the emergency of the RRC establishment cause value, then the network cannot identify that the corresponding call is the PS call. Thus, the terminal may additionally provide the network with the information that the corresponding call is the Prose-enabled PS call. The information may be included in the RRC connection establishment complete message.

The terminal configures the mo-Data of the existing RRC establishment cause value for the non-PS call. Additionally, the terminal may not provide the network with the information indicating that the corresponding call is the PS call or the non-PS call. Or, the terminal may provide the information indicating that the corresponding call is the non-PS call.

Embodiment 2

In the embodiment 2 of the method C, the terminal configures the 'highPriorityAccess' of the existing RRC establishment cause value for the PS call. The terminal may additionally provide the network with the information that the corresponding call is the PS call. The information may be provided in the RRC connection establishment process, and for example, may be included in the RRC connection establishment complete message.

The terminal configures the mo-Data of the existing RRC establishment cause value for the non-PS call. Additionally, the terminal does not provide the network with the information indicating whether the corresponding call is the PS call or the non-PS call. Or, the terminal may provide the network with the information indicating that the corresponding call is not the PS call.

Embodiment 3

In the embodiment 3 of the method C, the terminal may use not the existing RRC establishment cause value but a newly defined RRC establishment cause value for the PS call. For example, the new RRC establishment cause value indicates the 'ProSe.' Further, the terminal may additionally provide the network with information that the corresponding call is the PS call. The information may be provided in the RRC connection establishment process, and for example, may be included in the RRC connection establishment complete message.

The terminal configures the mo-Data of the existing RRC establishment cause value for the non-PS call. Additionally, the terminal does not provide the network with the information indicating whether the corresponding call is PS call or the non-PS call. Or, the terminal may provide the network with the information indicating that the corresponding call is the non-PS call, or the information indicating that the corresponding call is the Prose-enabled non-PS call.

If the above mentioned method C is used, then the network may identify between the PS call and non-PS call only based on the RRC connection establishment cause value. However, if various types of call are mapped to the same RRC establishment cause value, then the various types of call may not be identified. For example, if the PS call and the Prose-enabled emergency call (emergency call) is mapped to the same RRC establishment cause value (emergency call), then the network cannot identify that the corresponding call is the PS call or the Prose-enabled emergency call. In this case, the network may identify based on the information indicating any one among various types of calls, or may identify any one among various types of calls by recognizing in the absence of the information.

In the explanation of the present invention, the PS call and the non-PS call is mainly explained, but it is not limited thereto. That is, though the present invention has been triggered at the same application layer or service layer, but it may be applicable to identify various types of call requiring a different access control or different QoS. For example, it may be applicable to identify between the PS call by the MCPTT (Mission Critical Push To Talk) application and other general call (non-PS call).

Figure 24:
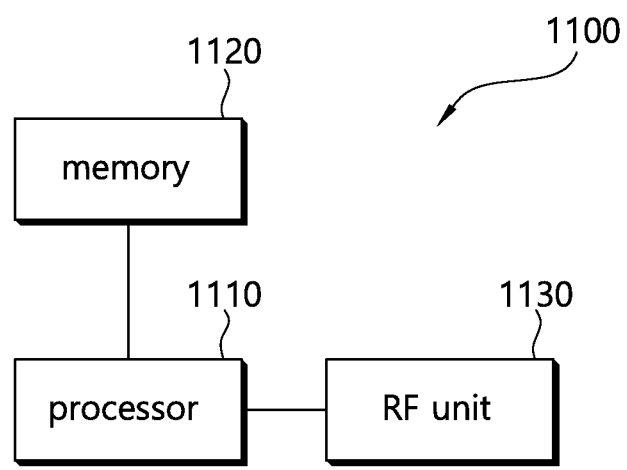
FIG. 24 is a block diagram representing the terminal in which the embodiment of the present invention is implemented.

FIG. 24 is a block diagram representing the terminal in which the embodiment of the present invention is implemented.

Referring to FIG. 24, the terminal 1100 includes a processor 1110, a memory 1120 and a RF unit (radio frequency unit) 1130. The processor 1110 implements the suggested function, process, and/or method. For example, the processor 1110 transmits the information informing the necessity of the control message transmission among the terminal, and receives a configuration on the control message transmission among the terminal. Further, the processor 1110 transmits the control message among the terminal to the other terminal based on the configuration.

The RF unit 1130 is coupled with the processor 1110, and transmits and/or receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

What is claimed is:

1. A method for transmitting a resource pool announcement in a wireless communication system, the method performed by a first user equipment (UE) and comprising:
    transmitting, to a network, resource pool announcement necessity information;
    receiving from the network, a configuration for the resource pool announcement in response to the resource pool announcement necessity information; and
    transmitting, to a second UE, the resource pool announcement based on the configuration,
    wherein the resource pool announcement necessity information informs the network that the first UE, which is in a network coverage, must transmit the resource pool announcement to the second UE which is out of the network coverage, and
    wherein the resource pool announcement indicates at least one of a plurality of resources which is used for transmitting a device-to-device (D2D) signal in the network coverage.

2. The method of claim 1, wherein the resource pool announcement further indicates the second UE of information required to perform a relay function by the first UE between the second UE and the network.

3. The method of claim 1, wherein the resource pool announcement necessity information is transmitted via a radio resource control (RRC) message.

4. The method of claim 1, wherein the resource pool announcement is a control message to be used for public safety.

5. The method of claim 1, further comprising:
    transmitting to the network, information indicating that the resource pool announcement is no longer required.

6. A user equipment (UE), the UE comprising:
    a transceiver; and
    a processor, operatively coupled to the transceiver, wherein the processor is configured to:
    control the transceiver to transmit, to a network, resource pool announcement necessity information;
    control the transceiver to receive from the network, a configuration for the resource pool announcement in response to the resource pool announcement necessity information; and
    control the transceiver to transmit, to a second UE, a resource pool announcement based on the configuration,
    wherein the resource pool announcement necessity information informs the network that the first UE, which is in a network coverage, must transmit the resource pool announcement to the second UE which is out of the network coverage, and
    wherein the resource pool announcement indicates at least one of a plurality of resources which is used for transmitting a device-to-device (D2D) signal in the network coverage.

7. The UE of claim 6, wherein the resource pool announcement further indicates the second UE of information required to perform a relay function by the first UE between the second UE and the network.

8. The UE of claim 6, wherein the resource pool announcement necessity information is transmitted via a radio resource control (RRC) message.

9. The UE of claim 6, wherein the resource pool announcement is a control message to be used for public safety.

10. The UE of claim 6, wherein the UE further transmits to the network, information indicating that the resource pool announcement is no longer required.

* * * * *